United States Patent
Oonishi et al.

(10) Patent No.: US 9,798,397 B2
(45) Date of Patent: Oct. 24, 2017

(54) TOUCH PANEL SYSTEM AND ELECTRONIC DEVICE

(71) Applicant: SHARP KABUSHIKI KAISHA, Osaka-shi, Osaka (JP)

(72) Inventors: Yoshinori Oonishi, Osaka (JP); Takashi Ishikawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 156 days.

(21) Appl. No.: 14/783,045

(22) PCT Filed: Mar. 31, 2014

(86) PCT No.: PCT/JP2014/001901
§ 371 (c)(1),
(2) Date: Oct. 7, 2015

(87) PCT Pub. No.: WO2014/174771
PCT Pub. Date: Oct. 30, 2014

(65) Prior Publication Data
US 2016/0070371 A1    Mar. 10, 2016

(30) Foreign Application Priority Data

Apr. 25, 2013 (JP) .................................. 2013-093066

(51) Int. Cl.
*G06F 3/0354* (2013.01)
*G06F 3/044* (2006.01)
*G06F 3/041* (2006.01)

(52) U.S. Cl.
CPC .......... *G06F 3/03545* (2013.01); *G06F 3/044* (2013.01); *G06F 3/0412* (2013.01);
(Continued)

(58) Field of Classification Search
CPC .... G06F 3/03545; G06F 3/0412; G06F 3/044; G06F 3/0414; G06F 3/0354
(Continued)

(56) References Cited

U.S. PATENT DOCUMENTS

2001/0006383 A1*  7/2001  Fleck .................. G06F 3/03545
                                                                   345/179
2006/0060752 A1*  3/2006  Lee ....................... G06F 3/0412
                                                                   250/208.1
(Continued)

FOREIGN PATENT DOCUMENTS

| JP | 2012-168919 A | 9/2012 |
| WO | WO 2012/090537 A1 | 7/2012 |
| WO | WO 2012/157271 A1 | 11/2012 |

OTHER PUBLICATIONS

International Search Report, issued in PCT/JP2014/001901, dated Jun. 17, 2014.

*Primary Examiner* — Fred Tzeng
(74) *Attorney, Agent, or Firm* — Birch, Stewart, Kolasch & Birch, LLP

(57) ABSTRACT

Pen pressure can be controlled in detail only by a positional detection controlling side of a touch panel. Thus, pen pressure data will not be required to be transmitted from a touch pen to the touch panel, the touch pen itself will require no batteries, and neither the touch pen nor the touch panel requires a communication apparatus, thus reducing the weight of the touch pen itself and reducing the size thereof. Comprised is a touch panel system for measuring output signals of at least two adjacent sensor lines to obtain an input position (x, y) of an indicator and information (z) of a capacitance value from a difference value therebetween; comprising a pen pressure converting section 616D for converting the information (z) of the capacitance value into pen pressure data, wherein the input position (x, y) and the pen pressure data are transmitted to a drawing controlling section.

9 Claims, 40 Drawing Sheets

(52) U.S. Cl.
CPC .. *G06F 3/0414* (2013.01); *G06F 2203/04101* (2013.01); *G06F 2203/04111* (2013.01)

(58) Field of Classification Search
USPC ......................................................... 345/174
See application file for complete search history.

(56) References Cited

U.S. PATENT DOCUMENTS

| | | | |
|---|---|---|---|
| 2006/0109222 A1* | 5/2006 | Lee ..................... | G02F 1/13338 345/88 |
| 2007/0091078 A1* | 4/2007 | Park ..................... | G06F 3/0418 345/173 |
| 2010/0238122 A1* | 9/2010 | Chang ................... | G06F 3/0412 345/173 |
| 2011/0090146 A1* | 4/2011 | Katsurahira ........ | G06F 3/03545 345/156 |
| 2012/0319962 A1* | 12/2012 | Yang ..................... | G06F 3/0418 345/173 |
| 2014/0028634 A1* | 1/2014 | Krah ....................... | G06F 3/041 345/179 |
| 2014/0078101 A1* | 3/2014 | Katsurahira ............ | G06F 3/044 345/174 |
| 2015/0168466 A1* | 6/2015 | Park ....................... | G01B 7/004 324/76.39 |
| 2016/0306496 A1* | 10/2016 | Ishikawa ................ | G06F 3/044 |
| 2016/0349897 A1* | 12/2016 | Ishikawa ................ | G06F 3/044 |

\* cited by examiner

Fig.25

Table 11

| decimal point coordinate in Y direction \ X | 0.2 | 0.4 | 0.6 | 0.8 | 1.0 |
|---|---|---|---|---|---|
| 1.0 | X1.05 | X1.1 | x1.2 | X1.1 | X1.05 |
| 0.8 | X1.1 | x1.2 | x1.25 | x1.2 | X1.1 |
| 0.6 | x1.2 | x1.25 | x1.3 | x1.25 | x1.2 |
| 0.4 | X1.1 | x1.2 | x1.25 | x1.2 | X1.1 |
| 0.2 | X1.05 | X1.1 | x1.2 | X1.1 | X1.05 | decimal point coordinate in X direction

TOUCH PANEL SYSTEM AND ELECTRONIC DEVICE

TECHNICAL FIELD

The present invention relates to a touch panel system, in which a touch input is made to a touch panel as a position input operation and a display corresponding thereto is made, and an electronic device, such as a PC (personal computer) and a tablet terminal, with the touch panel system.

BACKGROUND ART

Conventionally, there are capacitance touch panels mounted on display screens of display apparatuses as conventional position input apparatuses for detecting positions at which capacitance values distributed in a matrix are changed. This touch panel is, for example, a conventional capacitance detection apparatus for detecting a distribution of capacitance values of a capacitance matrix formed in between an M number of drive lines DL and an L number of orthogonal sense lines SL.

In the touch panel of the conventional capacitance detection apparatus, when a finger or a touch pen contacts or comes close to the touch panel surface, the capacitance value of the position where the finger or touch pen contacts or comes close changes. By utilizing this phenomenon, the position at which the capacitance value is changed is detected to detect the position where the finger or touch pen has touched as coordinates.

A touch pen for a capacitance touch panel, in which a conductive material having the same characteristic as a finger is used on a predetermined portion of a tip of the pen, is disclosed in Patent Document 1.

FIG. 36 is a side view of a case that an input to the touch panel is made using the conventional touch pen disclosed in Patent Document 1.

In FIG. 36, with regard to the conventional touch panel system, detection is made with capacitance data from a touch panel 102, in which a tip section 101 of a touch pen 100 is allowed to contact the touch panel 102 and in which the three-dimensional coordinates (x1, y1, z1) of a tip point P1 of a conductive section 103 away from the touch panel 102 by a certain distance z1 are used as a pen input. The three-dimensional coordinates (x1, y1, z1) are such that the x and y coordinates are determined on the surface of the touch panel 102 and the z coordinate is determined in the vertical direction from the touch panel 102 to determine the three-dimensional coordinates (x1, y1, z1).

FIG. 37 is a side view showing a state where a tip section 101 of a conventional touch pen 100 in FIG. 36 is biased by a spring.

As shown in FIG. 37, the non-conductive tip section 101 of the conventional touch pen 100 is biased outwardly by a spring 104 within a conductive section 103. The non-conductive tip section 101 is capable of retracting into or protruding from the conductive section 103, which is consecutive from the non-conductive tip section 101, in accordance with pen pressure, to change the pen pressure in accordance with a detected height z (distance z) of the conductive section 103. The detected height z (distance z) of the conductive section 103 can be used by an application processing section 206 to be discussed below, as pen pressure information. The application processing section 206 is capable of making the handwriting of a handwritten letter bolder or capable of making the shade of the handwritten letter darker in an application to be discussed below, as the detected height z (distance z) of the conductive section 103 is shorter.

FIG. 38 is a functional block diagram of a conventional information terminal apparatus with which a conventional touch pen 100 and touch panel 102 of FIG. 36 are used.

In FIG. 38, a conventional information terminal apparatus 200 comprises: a capacitance touch panel 102; a sensor information obtaining section 201 for obtaining output information from the touch panel 102; a height computing section 202 for eliciting a distance z1 (height coordinate) from the touch panel 102 to the conductive section 103 of the touch pen 100 as height information, based on sensor information obtained by the sensor information obtaining section 201; a pen pressure converting section 203 for converting the height information into a pen pressure value; a coordinate calculating section 204 for eliciting XY coordinate values on the touch panel 102 of the conductive section 103 based on the sensor information; a coordinate correction section 205 for correcting the calculated XY coordinate values so that the values are adjusted to the position of the pen tip; an input information notifying section 205 for notifying the pen pressure information and XY coordinate information of the pen tip to an application processing section 206; and the application processing section 206 for performing processing, such as handwriting drawing, in accordance with the pen pressure based on an output from the input information notifying section 205.

According to the configuration described above, first, the sensor information obtaining section 201 obtains the three-dimensional coordinates (x1, y1, z1) of a tip point P1 of the conductive section 103 of the touch pen 100 as sensor information; and first, the coordinate calculating section 204 elicits the XY coordinate values on the touch panel 102 of the conductive section 103 based on the sensor information, and then the coordinate correction section 205 corrects the calculated XY coordinate values so that the values are adjusted to the position of the pen tip. In addition, the height calculating section 202 elicits height information (distance z1) based on the three-dimensional coordinates (x1, y1, z1) of the sensor information obtained by the sensor information obtaining section 201, and the pen pressure converting section 203 converts the height information (distance z1) into a pen pressure value.

Next, the application processing section 206 performs drawing display processing on handwriting drawing to make the shade of a handwritten letter darker in accordance with the pen pressure, based on XY coordinate information and pen pressure information from the input information notifying section 205.

PRIOR ART DOCUMENTS

Patent Documents

Patent Document 1; International Publication No. WO 2012/157271 Pamphlet

SUMMARY OF THE INVENTION

Problems to be Solved by the Invention

In the touch panel system in which positional input is made to the touch panel using the above-described conventional touch pen 100 disclosed in Patent Document 1, the three-dimensional coordinates (x1, y1, z1) of three-dimensional information of the tip section of the conductive section 103 of the touch pen 100 is obtained, a pen pressure value is obtained from the height information (distance z1 from the touch panel 102 to the lower end part of the conductive section 103) of the three-dimensional information, and handwriting drawing, for changing the boldness of the handwritten letter and making the shade thereof darker, is performed at the XY coordinate position from the three-dimensional information and in accordance with the pen pressure value, on the display screen.

In prior art, the tip of the conductive section 103 of the touch pen is not grounded to the touch panel. As a result, the capacitance value to be obtained is small, and it is difficult to sufficiently secure the difference from the threshold value level. Thus, it is not possible to control the pen pressure in detail. For example, FIG. 39 shows a letter, "A", in the Japanese language described with the prior art. In the prior art, whether or not the touching is made is mainly focused in actuality, and there is no sufficient level difference (difference value) provided between a signal level of three-dimensional touch coordinates and a threshold value signal level indicating as to whether or not touching is made. Thus, like the letter "A" in FIG. 39, it is not possible to control the line of the symbol or letter in accordance with the pen pressure in detail in a sufficiently thin or thick manner.

Accordingly, as shown in FIG. 40, a function of detecting pen pressure is added to the touch pen 100 itself as an active pen and detected pen pressure is wirelessly communicated to a touch panel 102 to attempt to express the boldness and shading of letters at multi-levels in accordance with the pen pressure. In FIG. 37, the tip section 101 is biased by the spring, and the pen pressure can be detected by the amount of the retraction or protrusion of the tip section 101.

With the above-described, conventional touch panel system disclosed in Patent Document 1, the function of detecting the pen pressure of the tip section 101 is added to the touch pen 100 itself as shown in FIG. 40, and thus the detected pen pressure data are transmitted to the touch panel 102 either in a wireless or wired manner. As a result, the touch pen 100 requires a battery as well as a mechanism and a circuit for converting dynamic pen pressure into communicable pen pressure signals. Furthermore, both the touch pen 100 and the touch panel 102 require a communication apparatus. Thus, there is a serious problem for the touch pen 100 to be large in size and to be heavy in weight.

The present invention solves the conventional problem described above. Furthermore, the present invention has the purpose of providing: a touch panel system in which pen pressure can be controlled in detail only by a positional detection controlling side of a touch panel so that pen pressure data will not be required to be transmitted from the touch pen to the touch panel, where the touch pen itself will not require any batteries and neither the touch pen nor the touch panel requires a communication apparatus, thus reducing the weight of the touch pen itself and reducing the size thereof; and an electronic device, such as PC (personal computers) and tablet terminals, for performing a positional input using the touch panel system.

Means for Solving the Problem

The touch panel system according to the present invention is a touch panel system for measuring output signals of at least two adjacent sensor lines to obtain an input position (x, y) of an indicator, and information (z) of a capacitance value from a difference value between the output signals of at least two adjacent sensor lines, wherein the touch panel system comprises a pen pressure converting section for converting the information (z) of the capacitance value into pen pressure data, and wherein the input position (x, y) and the pen pressure data are transmitted to a drawing controlling section, thereby achieving the objective described above.

The touch panel system according to the present invention comprises: a step of applying a signal to a drive line; a step of obtaining capacitance value (z) information in addition to input position (x, y) information of an indicator from a difference value between the output signals obtained from at least two adjacent sensor lines; a step of converting a region capacitance value (z) obtained from the three-dimensional value information (x, y, z) into pen pressure data; and a step of transmitting the converted pen pressure data to a host terminal, thereby achieving the objective described above.

Still preferably, the pen pressure converting section in the touch panel system according to the present invention converts the information (z) of the region capacitance value measured in accordance with the contacting or approaching of the indicator to the touch panel, into pen pressure data by referring to one or a plurality of tables.

Still preferably, the table in the touch panel system according to the present invention stores pen pressure data to be corrected in accordance with the indicator, wherein the pen pressure data with regard to the information (z) of the region capacitance value changes in a two-dimensional function manner at a predetermined inclination.

Still preferably, the plurality of tables in the touch panel system according to the present invention store the pen pressure data with regard to the information (z) of the region capacitance value, wherein the information (z) of the region capacitance value is divided into a plurality of sections and wherein inclination of the pen pressure data with regard to the information (z) of the region capacitance value is determined and linearly changed for each section of the information (z) of the region capacitance value.

The touch panel system according to the present invention is a touch panel system for measuring output signals of at least two adjacent sensor lines to obtain an input position (x, y) of an indicator and information (z) of a capacitance value from a difference value between the output signals of at least two adjacent sensor lines, wherein the touch panel system comprises a pen pressure converting section for converting the information (z) of the capacitance value into pen pressure data, and wherein the input position (x, y) and the pen pressure data are transmitted to a drawing controlling section, thereby achieving the objective described above.

The touch panel system according to the present invention is a touch panel system for outputting data corresponding to three-dimensional coordinates (x, y, z) of a capacitance value, including information (z) of a capacitance value and output coordinates (x, y) obtained when an input position (x, y) of an indicator is indicated to a touch panel, the touch panel system comprising a surface data extracting section for extracting a shape of the indicator contacting or approaching a surface of the touch panel as surface data, thereby achieving the objective described above.

The touch panel system according to the present invention is a touch panel system for outputting data corresponding to three-dimensional coordinates (x, y, z) of a capacitance value, including information of a capacitance value obtained when an input position (x, y) of an indicator is indicated to a touch panel, the touch panel system comprising a surface data extracting section for extracting a shape of the indicator contacting or approaching a surface of the touch panel as surface data, thereby achieving the objective described above.

Preferably, the surface data extracting section in the touch panel system according to the present invention extracts a surface shape of a sensor detected coordinate range equal to or more than a predetermined value of the detected capacitance value as the surface data.

Still preferably, the surface data extracting section in the touch panel system according to the present invention simplifies surface information of a width of an x direction and a height of a y direction based on the sensor detected coordinate range and extracts the surface information as the surface data together with the surface shape, or extracts the surface information instead of the surface shape.

Still preferably, the surface data extracting section in the touch panel system according to the present invention comprises: a peak capacitance coordinate detecting means for detecting a peak capacitance coordinate Cmax (n, m) from a capacitance C (m, n) map of m rows and n columns in a matrix; and a surface map forming means for creating a predetermined area to be at the center of the map with the peak capacitance coordinate Cmax (n, m) detected by the peak capacitance coordinate detecting means as the input position (x, y), compares each capacitance value C (n, m) of the extracted predetermined area with the predetermined threshold value, and extracts a surface shape and/or surface information equal to or more than the predetermined threshold value as the surface map.

The touch panel system according to the present invention is a touch panel system for indicating an input position to a touch panel and outputting positional information (x, y) of a detection surface obtained from an output signal of the touch panel and information of a capacitance value corresponding thereto, wherein the touch panel system comprises a strength correcting section for correcting variation of a capacitance property that periodically varies for each predetermined position within the detection surface, with regard to at least either of the x direction or y direction of positional information (x, y) of the detected surface, thereby achieving the objective described above.

Still preferably, within a cycle of at least one direction, in which a capacitance property varies for each predetermined position, the strength correcting section in the touch panel system according to the present invention determines information of a capacitance value to be output as information of any one of the capacitance values within the range of the cycle obtained within the cycle.

Still preferably, the strength correcting section in the touch panel system according to the present invention is provided with a storing section, wherein the strength correction section monitors a periodic specific coordinate range of at least one direction of the x and y directions of the detection surface (x, y), updates information of the capacitance value in the specific coordinate range on the storing section, and uses information of the capacitance value stored on the storing section immediately before for a coordinate range other than the specific coordinate range to correct the capacitance value.

Still preferably, the strength correcting section in the touch panel system according to the present invention is provided with a storing section; one or a plurality of correction tables, having a plurality of correction parameters in accordance with coordinate positions in the x direction and the y direction of a detection surface, which are stored on the storing section; where the strength correcting section performs strength-correction on a capacitance property of the height information that periodically varies, to a uniform capacitance property, using a correction parameter in accordance with the coordinate position, while referring to the one or a plurality of correction tables in accordance with information of the capacitance value.

The electronic device according to the present invention is capable of performing display by corresponding the display to a positional input from a touch panel system described above according to the present invention, thereby achieving the objective described above.

Hereinafter, the functions of the present invention will be described with regard to the configuration described above.

In the present invention, comprised is a touch panel system for measuring output signals of at least two adjacent sensor lines to obtain three-dimensional coordinates (x, y, z) consisting of an input position (x, y) of an indicator and information (z) of a capacitance value from a difference value between the output signals of at least two adjacent sensor lines, wherein the touch panel system comprises a pen pressure converting section for converting the information (z) of the capacitance value into pen pressure data, and wherein the input position (x, y) and the pen pressure data are transmitted to a drawing controlling section.

Accordingly, the information z of the capacitance value of the three-dimensional coordinates (x, y, z) is converted into pen pressure data, so that the positional detection controlling side alone of the touch panel can control pen pressure in detail. In addition, as a result, pen pressure data will not be required to be transmitted from an indicator, such as a touch pen, to the touch panel. The indicator itself will not require any batteries, and neither the indicator nor the touch panel require a communication apparatus, thus reducing the weight of the indicator itself and reducing the size thereof.

Effects of the Invention

From the foregoing, according to the present invention, the information z of the capacitance value of the three-dimensional coordinates (x, y, z) is converted into pen pressure data so that the positional detection controlling side alone of the touch panel can control pen pressure in detail. In addition, as a result, pen pressure data will not be required to be transmitted from an indicator, such as touch pens, to the touch panel, the indicator itself will not require any batteries, and neither the indicator nor the touch panel require a communication apparatus, thus reducing the weight of the indicator itself and reducing the size thereof.

BRIEF DESCRIPTION OF THE DRAWINGS

FIG. 25 is a diagram showing a single correction parameter (table) used in FIG. 23.

Figure 1:
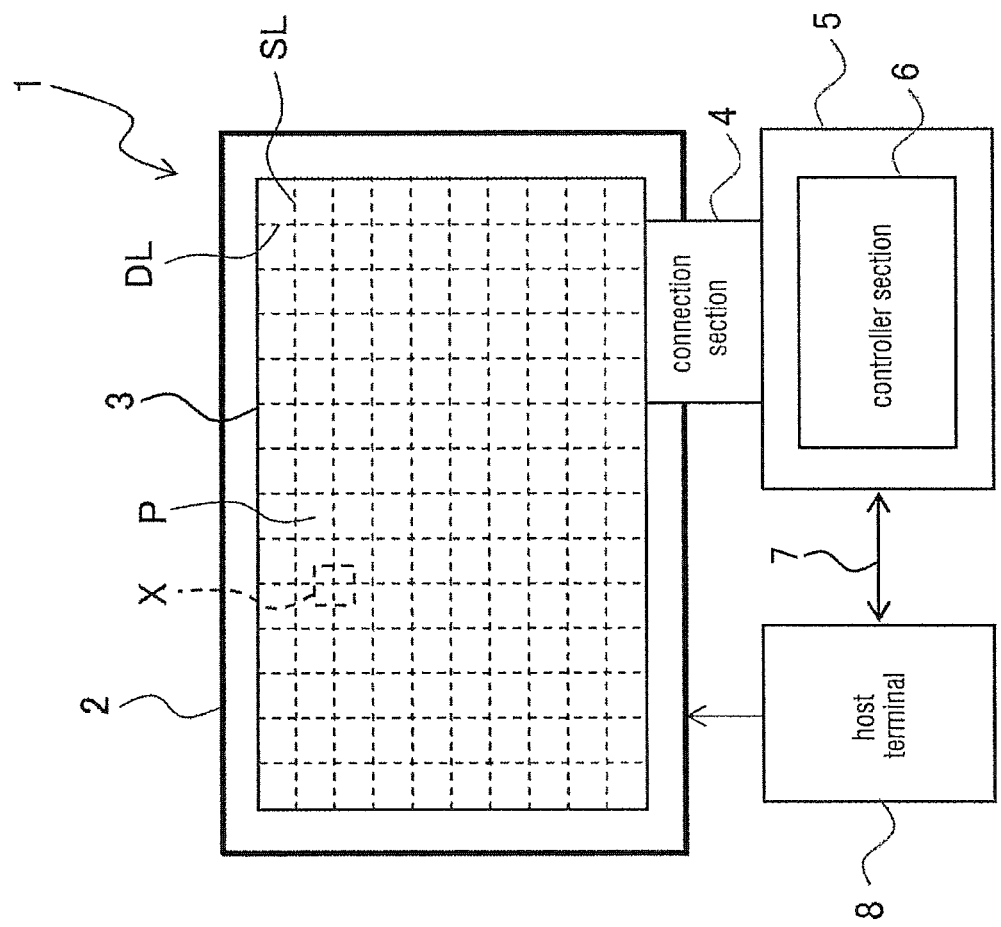
FIG. 1 is a block diagram showing an overall configuration example of a touch panel system according to Embodiment 1 of the present invention.

REFERENCE SIGNS LIST 1 touch panel system
2 display apparatus
3 touch panel
4 connection section
5 substrate
6 controller (controlling section; central processing unit system, CPU)
7 connection cable
8 host terminal (application section)
9 touch pen (indicator)
10, 12 decimal point extracting circuit
11, 15, 15A, 15B table
13 table 1/n
14 table 2/n
16, 17 image equivalent line of sense lines SL
161, 171, 221, 231 electrode
21 to 23 image equivalent line of drive lines DL
61 indicator position detecting section
611 amplification section
612 signal obtaining section
613 A/D converting section
614 decoding processing section
615 detection standard determining section
615A drive timing generating section
615B drive line drive instructing section
615C data receiving section
615D first threshold value judging section
615E surface data extracting section
615F strength correcting section
615G second threshold value judging section
616 positional information generating section
616A data receiving section
616B ID assigning section
616C coordinate converting section
616D pen pressure converting section
62 drive line driving section
DL drive line (lower electrode)
SL sense line (upper electrode)
X position of an indicator (detection region)
P detection surface
30 electronic device
31 display apparatus controlling section (application section)
32 button switch section
33 image capturing section
34 audio output section
35 sound collecting section
36 audio processing section
37 wireless communication section
38 antenna
39 wire communication section
40 storing section
41 main body controlling section

EMBODIMENTS FOR CARRYING OUT THE INVENTION

Hereinafter, Embodiment 1 of a touch panel system according to the present invention, and Embodiment 2 of an electronic device, such as a PC (personal computer) and a tablet terminal, using Embodiment 1 of the touch panel system will be described in detail with reference to the drawings. It should be noted that the thickness, the length or the number of each of the constituent members in the respective drawings is not limited to the illustrated configuration from the viewpoint of creating such drawings.

(Embodiment 1)

FIG. 1 is a block diagram showing an overall configuration example of a touch panel system according to Embodiment 1 of the present invention.

In FIG. 1, the touch panel system 1 according to Embodiment 1 comprises: a display apparatus 2 having a display screen for displaying an image; a touch panel 3 provided on the display screen for detecting a position; a connection section 4 connected to the touch panel 3; a substrate 5 connected to the connection section 4; a controller 6 mounted on the substrate 5 for performing position detection controlling; a connection cable 7 connected to the controller 6 through the substrate 5; and a host terminal 8 connected to the controller 6 through the connection cable 7, and connected to the display apparatus 2 to control the display of the display apparatus 2.

The display apparatus 2 may be, for example, a liquid crystal display (liquid crystal display apparatus), a plasma display, an organic EL display or a field emission display, or in addition, may be any displays for displaying an image on a display screen thereof.

The touch panel 3 comprises: a plurality of drive lines DL (lower electrode), provided in parallel to each other along a detection surface P and functioning as longitudinal Y wiring, each of which is driven by a drive signal provided therefor; and a plurality of sense lines SL (upper electrode), provided in parallel to each other along the detection surface P in such a manner to cross the plurality of drive lines DL (grade separation; perpendicular crossing and crossing with the angles other than the perpendicular angle) and functioning as X wiring formed in between the drive lines DL as the drive lines DL are driven for outputting an output signal in accordance with change in capacitance due to the presence or absence of an indicator (e. g., finger and touch pen) contacting or getting closer thereto.

The output signal from the sense lines SL is a signal indicating as to whether or not an indicator, such as a finger or a pen, is contacting or getting closer to a detection region X (crossing part or part nearby between the drive lines DL and the sense lines SL; the same applies hereinafter) within the detection surface P. Specifically, the output signal is a signal indicating three-dimensional coordinate information indicating the presence or absence of contact or approaching the detection region X, and an absolute value information (z) of capacitance by an indicator and position information (x, y) of a two-dimensional detection region X. As the z value of the absolute value information (z) of capacitance becomes smaller, the signal level for indicating a capacitance value becomes smaller.

The connection section 4 is formed of an FPC (flexible print) substrate, one end of which is electrically connected to each electrode drawing section of the drive lines DL and sense lines SL, and the other end of which is connected to a circuit terminal of the substrate 5.

With regard to the substrate 5, a chip-shaped controller 6 is mounted at the center portion thereof, and the other end of the FPC substrate, as the connection section 4, is connected to the circuit terminal of the substrate 5.

The controller 6 drives each of the drive lines DL, and performs signal-processing on output signals from each of the sense lines SL to detect and control the position (detection region X) of an indicator within the detection surface P.

The connection cable 7 is such that one end thereof is electrically connected to a circuit terminal of the substrate 5 which is further connected to an input output terminal of the controller 6, and the other end thereof is electrically connected to the host terminal 8.

The host terminal 8 is constituted of a personal computer and the like for controlling the controller 6 through the connection cable 7, and for displaying and controlling an image displayed on the display screen of the display apparatus 2 based on the position (touch detection region X) of an indicator detected by the controller 6 as well as a variety of types of information (pen pressure information).

In addition, the host terminal connected to the touch panel system 1 may be at the server side like a cloud service, and it is also possible to allow the touch panel system itself to have the function of the host terminal to control the display.

Figure 2:
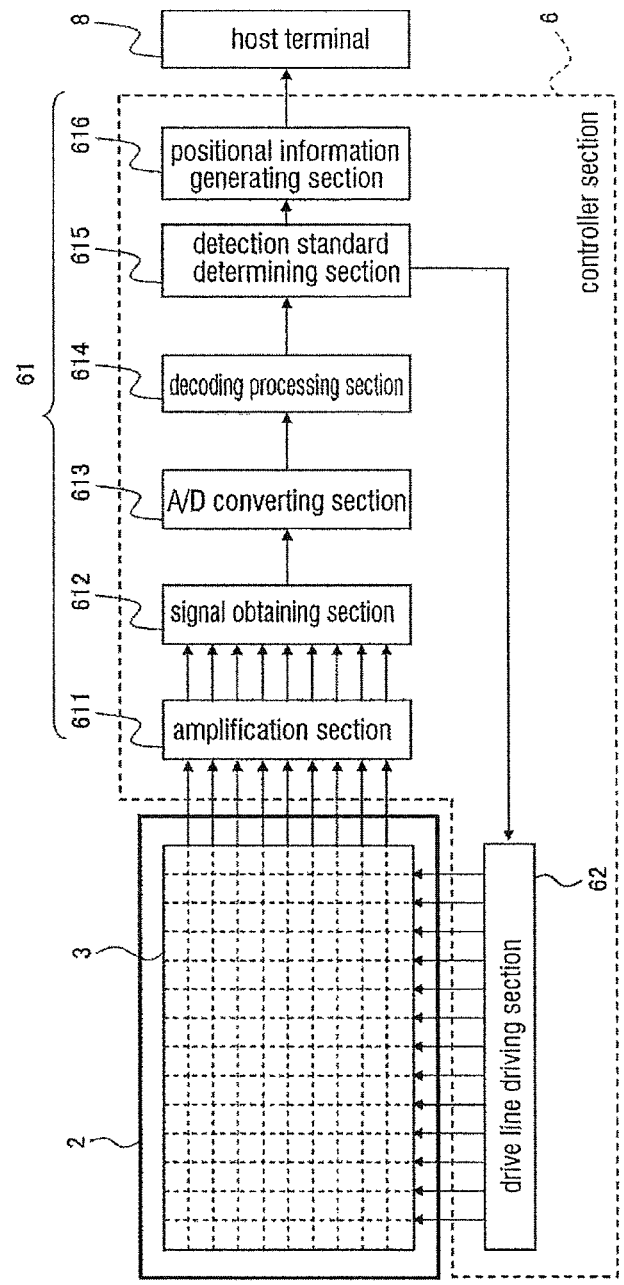
FIG. 2 is a block diagram showing a configuration example in a controller 6 of a touch panel system 1 of FIG. 1.

FIG. 2 is a block diagram showing a configuration example in a controller 6 of a touch panel system 1 of FIG. 1.

In FIG. 2, the controller 6, according to Embodiment 1, comprises: an indicator position detecting section 61 for performing signal-processing on output signals from the sense lines SL to detect a position (detection region X) of an indicator within a detection surface P and a variety of kinds of information (pen pressure information); and a drive line driving section 62 for successively driving drive lines DL.

The indicator position detecting section 61 comprises: an amplification section 611 for amplifying an output signal output from each of sense lines SL; a signal obtaining section 612 for obtaining an output signal amplified by the amplification section 611 to output the signal in a time division manner; an A/D converting section 613 for converting an analog signal output by the signal obtaining section 612 into a digital signal; a decoding processing section 614 for obtaining a distribution of an amount of change in capacitance within a detection surface P based on a digital signal that is A/D converted by the A/D converting section 613; a detection standard determining section 615 for setting a detection standard value (threshold value) used in detecting a position (detection region X) of an indicator within a detection surface P by a positional information generating section 616 to be discussed below, and for performing surface data extraction processing and strength correction processing, which are characteristic configurations of Embodiment 1; and a positional information generating section 616 for detecting a position (detection region X) of an indicator within a detection surface P based on a detected standard value with regard to distribution of an amount of change in capacitance obtained by the decoding processing section 614 to generate positional information indicating the position of the indicator, and for performing pen pressure converting processing, which is a characteristic configuration of Embodiment 1.

The drive line driving section 62 outputs predetermined drive signals successively or all together for each plurality of drive lines DL to drive a plurality of drive lines DL.

In the meantime, from two or more sense lines SL crossing over the drive lines DL driven by the drive line driving section 62, output signals in accordance with the change in the capacitance formed with the drive lines DL are obtained by the amplification section 611. The difference in output signal values is read out from the adjacent sense lines SL based on the amplified output signals at the signal obtaining section 612. The reading out of the difference balances out noise, and a coordinate signal level greater than the threshold value level (signal level that is 5 to 20 times the noise component compared to the conventional level) is obtained. Thus, it becomes possible to detect a large capacitance value. Absolute information (z value) of the thus obtained capacitance is converted into multi-level, pen pressure data, and the pen pressure is controlled in detail based on the pen pressure data so that the boldness and shade of letters can be expressed in a variety of ways. Note that in the prior art, a capacitance value is directly detected, and the detected capacitance value is compared with a threshold value only to detect as to whether or not touching is made.

The decoding processing section 614 performs decode-processing on a digital signal obtained from the A/D converting section 613, based on a signal pattern of drive signals that the drive line driving section 62 has provided successively or all together to each of the drive lines DL, to obtain distribution of an amount of change in capacitance within the detection surface P.

Before detecting a touch position of an indicator, and for example, at a calibration time performed immediately after the start-up of touch panel system 1, and in a state where there is no indicator (such as a finger or a touch pen) contacting or getting closer to the detection surface P, the decoding processing section 614 obtains a digital signal obtained from each of the obtained output signals to obtain, in advance, two-dimensional distribution of capacitance within the detection surface P in a state where there is no indicator (such as a finger or a touch pen) contacting or getting closer to the detection surface P. Furthermore, the decoding processing section 614 compares distribution of capacitance within the detection surface P in a state where there is no indicator contacting or getting closer to the detection surface P with distribution of capacitance within the detection surface P obtained at the positional detection of the indicator. This is to obtain distribution of an amount of change in capacitance within the detection surface P, that is, two-dimensional distribution of the component of capacitance changed due to the contacting or approaching of the indicator to the detection surface P. Furthermore, the decoding processing section 614 is able to subtract two-dimensional distribution of capacitance within the detection surface P in a state where there is no indicator contacting or approaching the detection surface P, from two-dimensional distribution of capacitance within the detection surface P obtained at the detection of a touch position of the indicator. This is to obtain three-dimensional distribution of an amount of change in capacitance within the detection surface P wherein the indicator contacted or approached. The three-dimensional distribution of an amount of change in capacitance corresponds to three-dimensional coordinates (x, y, z) of a capacitance value including an absolute information (z) of a capacitance value obtained by instructing an input position (x, y) of the indicator to the touch panel 3, which will be discussed below.

The detection standard determining section 615 determines a detection standard value (threshold value) with regard to distribution of an amount of change in capacitance obtained from the decoding processing section 614. For example, a detection standard (threshold value) obtained by the detection standard determining section 615 is stored in a storing section (not shown). Note that the surface data extraction processing and strength correction processing, which are characteristic configurations of Embodiment 1, performed at the detection standard determining section 615 will be described in detail with reference to the following FIG. 3 and onwards.

The positional information generating section 616 obtains the position of the indicator within the detection surface P to generate positional information, using detection standards and the distribution of an amount of change in capacitance within the detection surface P obtained by the decoding processing section 614.

The positional information generating section 616 obtains a touch position in the distribution of an amount of change in capacitance within the detection surface P, and determines the touch position as the position of the indicator contacting or approaching the detection surface P if the amount of change in capacitance at the touch position is greater than the detection standard value.

The positional information generating section 616 may obtain a touch position (position at which the absolute value information (z) of capacitance is at its maximum) using all of the detection region of capacitance within the detection surface P, or may obtain a touch position (position at which the absolute value information (z) of capacitance is at its maximum) using a part of the detection region (e.g., portion at which the amount of change in capacitance is greater than a predetermined threshold value). In addition, the positional information generating section 616 may obtain the amount of change in capacitance at the touch position by performing interpolation processing on the amount of change in capacitance in a detection region near the touch position (or part of the detection surface).

The positional information generating section 616 generates and outputs positional information indicating the position of an indicator on the detection surface P. At this stage, in the case when it was not possible to obtain a position of an indicator contacting or approaching the detection surface P, such as the case when there is no indicator contacting or approaching the detection surface P, the positional information generating section 616 may generate and output such a fact as positional information.

In this regard, in the present application, it is possible to switch the drive lines with the sense lines, and in FIG. 1, the upper electrode may be defined as drive lines DL and the lower electrode may be defined as sense lines SL.

Furthermore, a function may be provided to switch the amplification section and driving section connected to the sense lines SL and drive lines DL described above to switch the roles of the upper electrode and lower electrode (sense/drive) periodically during the operation of the touch panel.

Note that the pen pressure converting processing, which is a characteristic configuration of Embodiment 1, performed by the positional information generating section 616 will be described in detail with reference to the following FIG. 4 and onwards.

Figure 3:
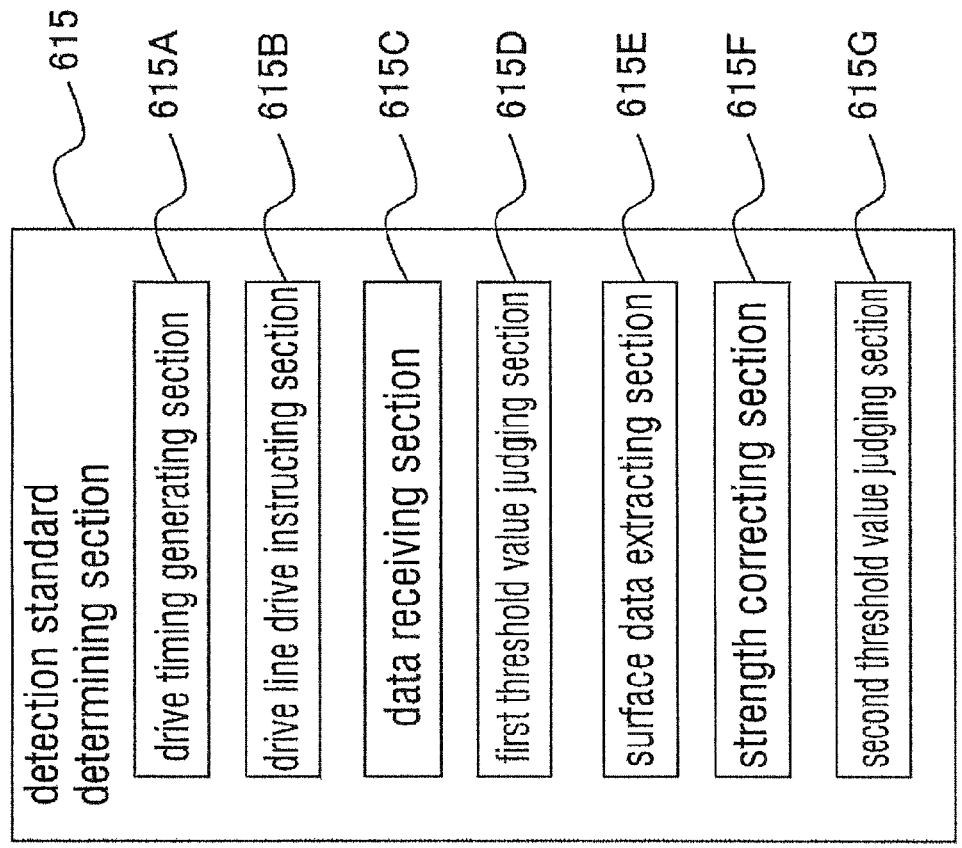
FIG. 3 is a block diagram showing a configuration example of a detection standard determining section of FIG. 2.

FIG. 3 is a block diagram showing a configuration example of a detection standard determining section 615 of FIG. 2.

As shown in FIG. 3, the detection standard determining section 615 comprises: a drive timing generating section 615A for generating drive timing to the drive line driving section 62; a drive line drive instructing section 615B for instructing driving of a next drive line DL; a data receiving section 615C for receiving capacitance distribution data from the decoding processing section 614; a first threshold value judging section 615D for performing threshold value determining processing; a surface data extracting section 615E for extracting a coordinate value, a capacitance value and a surface value with regard to data obtained after threshold value determining processing; a strength correcting section 615F for correcting a capacitance value so that the capacitance value will not vary in accordance with positions; and a second threshold value judging section 615G for performing threshold value determining.

The surface data extracting section 615E extracts a shape of an indicator contacting or approaching the surface of the touch panel 3 as surface data. Specifically, the surface data extracting section 615E extracts a surface shape within a sensor detected coordinate range and at or above a predetermined threshold value of the detected capacitance value, as surface data.

The strength correcting section 615F performs strength-correction on a capacitance property of height information z, which periodically varies with regard to at least either of the x direction or y direction of a detection surface (x, y), to a uniform capacitance property, with regard to distribution of three-dimensional coordinates (x, y, z) including absolute value information (z) (information on capacitance values) of a capacitance value that periodically varies for each predetermined position within the detection surface (x, y) obtained from respective output signals of the touch panel 3. A uniform capacitance property corresponds to a peak capacitance value that periodically varies in accordance with predetermined positions within the detection surface (x, y). Without limitation to this, the uniform capacitance property may correspond to a middle of variable value. Furthermore, without limitation to this, the uniform capacitance property may correspond to any value of the variable values.

Figure 4:
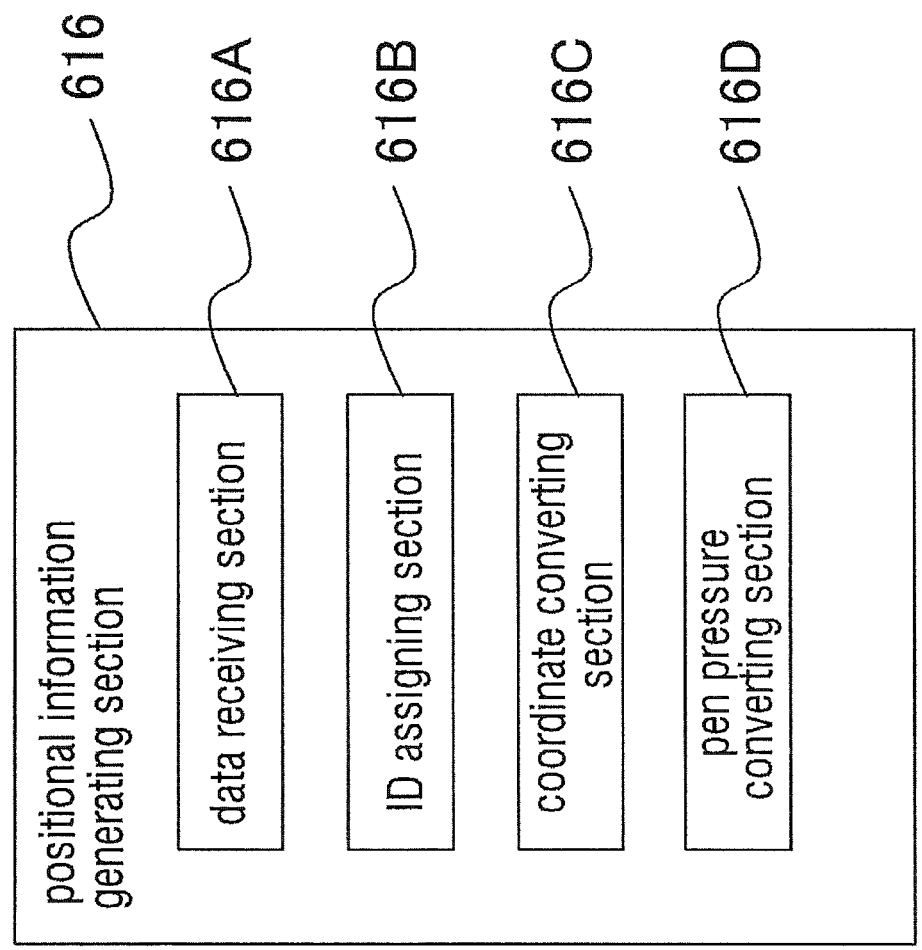
FIG. 4 is a block diagram of a configuration example of a positional information generating section of FIG. 2.

FIG. 4 is a block diagram of a configuration example of a positional information generating section 616 of FIG. 2.

As shown in FIG. 4, the positional information generating section 616 comprises: a data receiving section 616A for receiving data from the detection standard determining section 615; an ID assigning section 616B for distinguishing touch inputs when a plurality of such touch inputs are made using an indicator; and a coordinate converting section 616C for performing coordinate converting processing; and a pen pressure converting section 616D for performing pen pressure converting processing.

The pen pressure converting section 616D drives each at least two adjacent drive lines DL successively or all together, indicates an input position (x, y) of an indicator, to the touch panel 3 to obtain three-dimensional coordinates (x, y, z) of a capacitance value, and in the touch panel system 1 for performing a display that corresponds to the three-dimensional coordinates (x, y, z), converts absolute value information (z) of a capacitance value of the three-dimensional coordinates (x, y, z) into pen pressure data.

Figure 5:
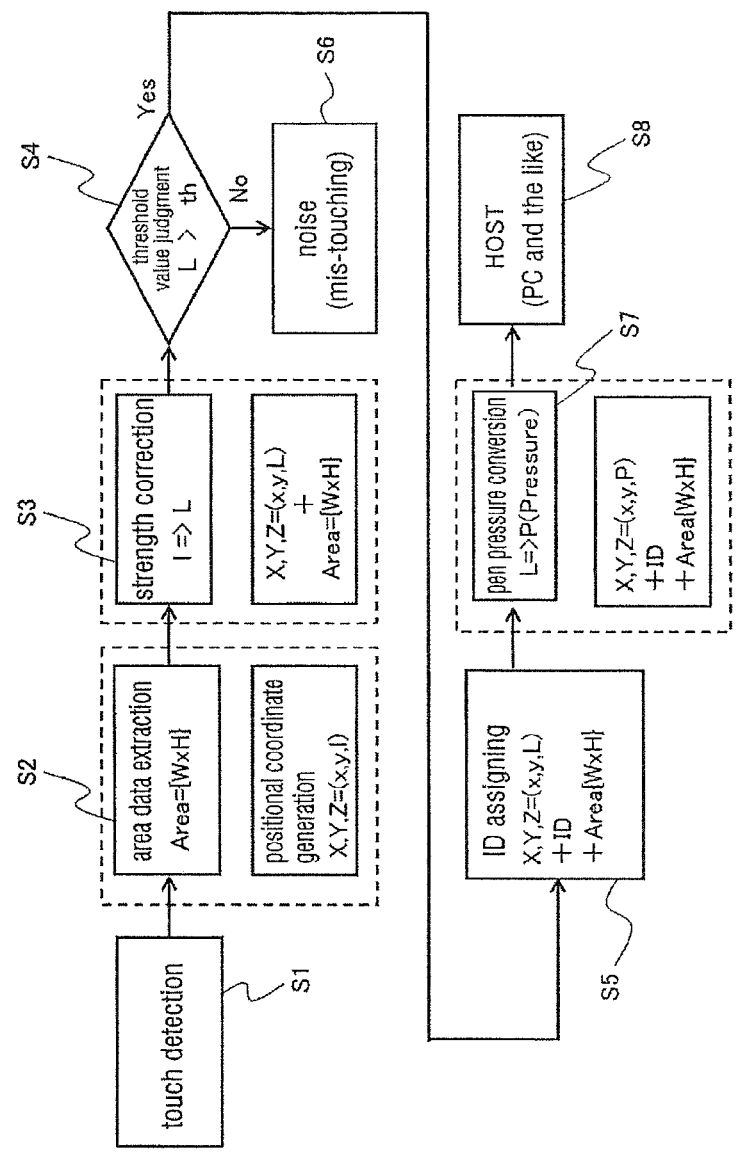
FIG. 5 is a flowchart for describing an operation example of a controller of a touch panel system in FIG. 2.

FIG. 5 is a flowchart for describing an operational example of a controller 6 of a touch panel system 1 in FIG. 2.

As shown in FIG. 5, first, touch detection processing is performed at step S1. In the touch detection processing, the amplification section 611 amplifies output signals output from respective sense lines SL. The signal obtaining section 612 obtains the output signals amplified by the amplification section 611 and outputs them in a time division manner. The A/D converting section 613 converts analog signals output by the signal obtaining section 612 into digital signals. Based on the digital signals A/D converted by A/D converting section 613, the decoding processing section 614 obtains distribution of the amount of change in capacitance within the detection surface P.

Next, at step S2, the surface data extracting section 615E of FIG. 3 generates surface data of three-dimensional coordinates (x, y, 1) as positional coordinates, and using the data, performs surface data extracting processing for extracting surface data of W×H (width×height), for example.

Specifically, the surface data extracting section 615E extracts a surface shape within the sensor detected coordinate range and at or above a predetermined threshold value of the detected capacitance value, as surface data. Furthermore, the surface data extracting section 615E either simplifies surface information of the width in the x direction and the height in the y direction based on the sensor detected coordinate range and extracts only the information of the width and height of the surface data as a surface shape, or utilizes the extracted surface shape directly.

Subsequently, at step S3, the strength correcting section 615F of FIG. 3 performs strength correction processing. Periodical variation due to the position of the z value (information 1 of capacitance values) of three-dimensional coordinates (x, y, 1) is eliminated and three-dimensional coordinates (x, y, L) is generated.

Specifically, with regard to the distribution of three-dimensional coordinates (x, y, z) including the absolute value information (z) of a capacitance value that periodically varies for each predetermined position within the detection surface (x, y) obtained from respective output signals of the touch panel 3, the strength correcting section 615F performs strength-correction on the absolute value information (z), periodically varying in at least one direction of the x direction and y direction of the detection surface (x, y), to a uniform capacitance property.

Then, at step S4, threshold value determining processing is performed. If the data is greater than the threshold value (yes), then at step S5, if there are a plurality of touch detections, ID assigning processing is performed to distinguish touch detections, such as first touch detection, second touch detection, and third touch detection. Furthermore, at step S4, if the data are at or below the threshold value (No), then noise judgment (mis-touching) is made at step S6.

Furthermore, at step S7, the pen pressure converting section 616D of FIG. 4 performs pen pressure processing (three-dimensional coordinates (x, y, L)=(x, y, P); where P denotes pen pressure). At step S8, using the data after the surface data extracting processing, strength correction processing and pen pressure converting processing, the application section of the host terminal 8 controls the image displaying on the display screen of the display apparatus 2 based on the position (x, y, P; where P denotes pen pressure) of the touch-detected indicator and surface data.

Figure 6:
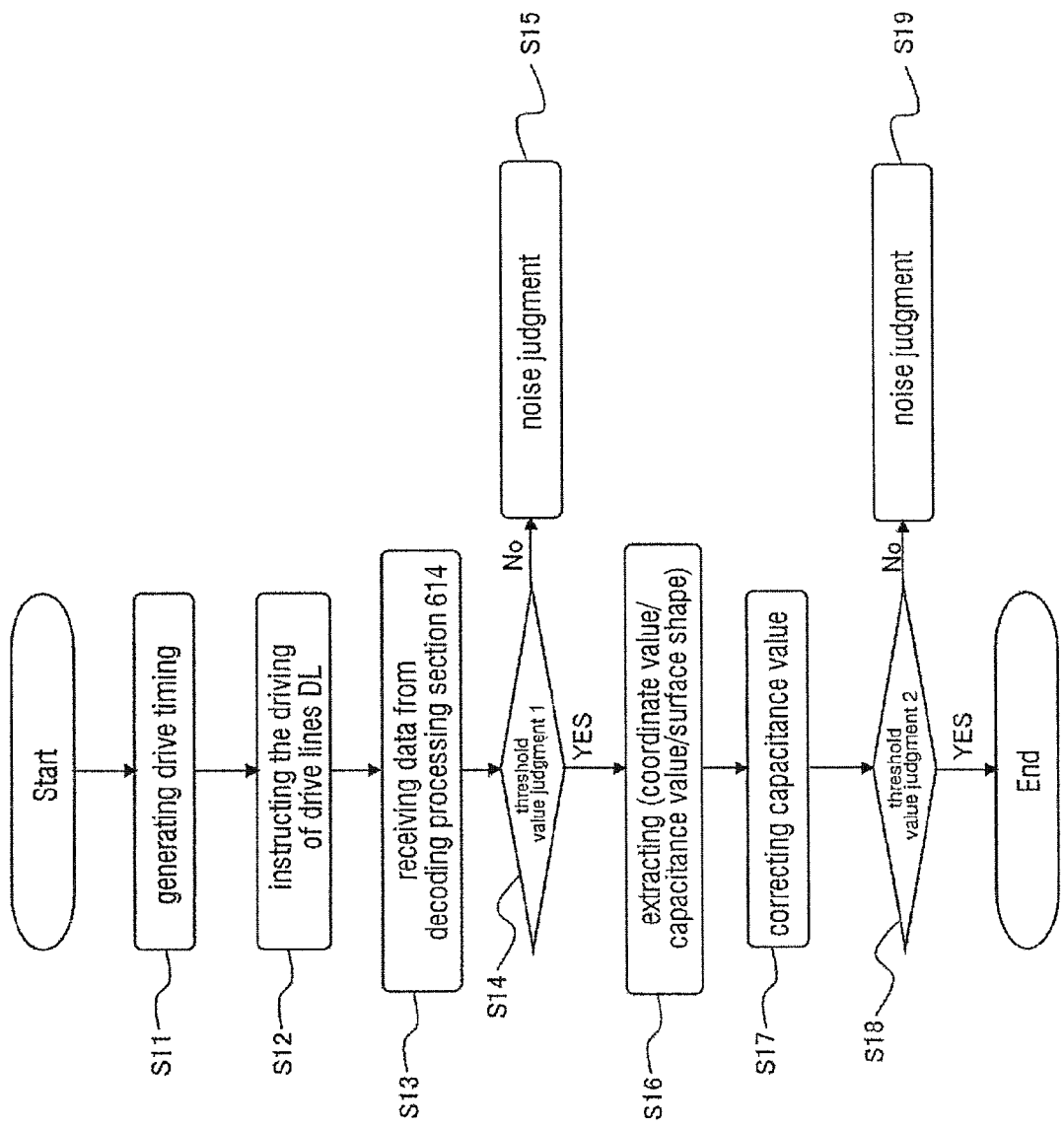
FIG. 6 is a flowchart for describing an operational example of surface data extracting processing of a detection standard determining section of FIG. 2.

FIG. 6 is a flowchart for describing an example of surface data extracting processing of a detection standard determining section 615 of FIG. 2.

As shown in FIG. 6, first, at step S11, the drive timing generating section 615A generates drive timing to the drive line driving section 62.

Next, at step S12, the drive line drive instructing section 615B instructs the drive line driving section 62 with regard to the driving of the next drive line DL.

Subsequently, at step S13, the data receiving section 615C receives capacitance distribution data (distribution data of an amount of change in capacitance within the detection surface P) from the decoding processing section 614.

Subsequently, at step S14, the first threshold value judging section 615D performs threshold value judgment. If the received data do not exceed the threshold value (No), noise judgment is made. If the received data exceed the threshold value (Yes), then at the next step S16, the surface data extracting section 615E extracts the coordinate value, capacitance value and surface shape thereof.

At step S16, in the surface data extracting section 615E, a peak capacitance coordinate detecting means detects a peak capacitance coordinate Cmax (n, m) from a capacitance C (m, n) map of m rows and n columns in a matrix. Next, a surface map forming means creates a predetermined area to be at the center of the map with the peak capacitance coordinate Cmax (n, m) detected by the peak capacitance coordinate detecting means as an input position (x, y), compares a capacitance value C (n, m) of the extracted predetermined area with the predetermined threshold value, and extracts a surface shape and/or surface information (W×H) of the sensor detected coordinate range equal to or more than the predetermined threshold value as a surface map.

Furthermore, at step S17, the strength correcting section 615F performs strength correction processing for correcting a capacitance value so that positional variation of the capacitance value is eliminated.

With regard to the distribution of three-dimensional coordinates (x, y, z) including the absolute value information (z) of a capacitance value that periodically varies for each predetermined position within the detection surface (x, y) obtained from respective output signals of the touch panel 3, the strength correcting section 615F performs strength-correction on the capacitance property of absolute value information (z), periodically varying to at least one direction of the x direction and y direction of the detection surface (x, y), to a uniform capacitance property.

Furthermore, at step S18, the second threshold value judging section 615G performs threshold value judgment. If the data after the capacitance value correction do not exceed the threshold value (No) at step S18, then noise judgment (mis-touch) is determined at step S19. If the data after the capacitance value correction exceed the threshold value (Yes), then the processing ends.

Figure 7:
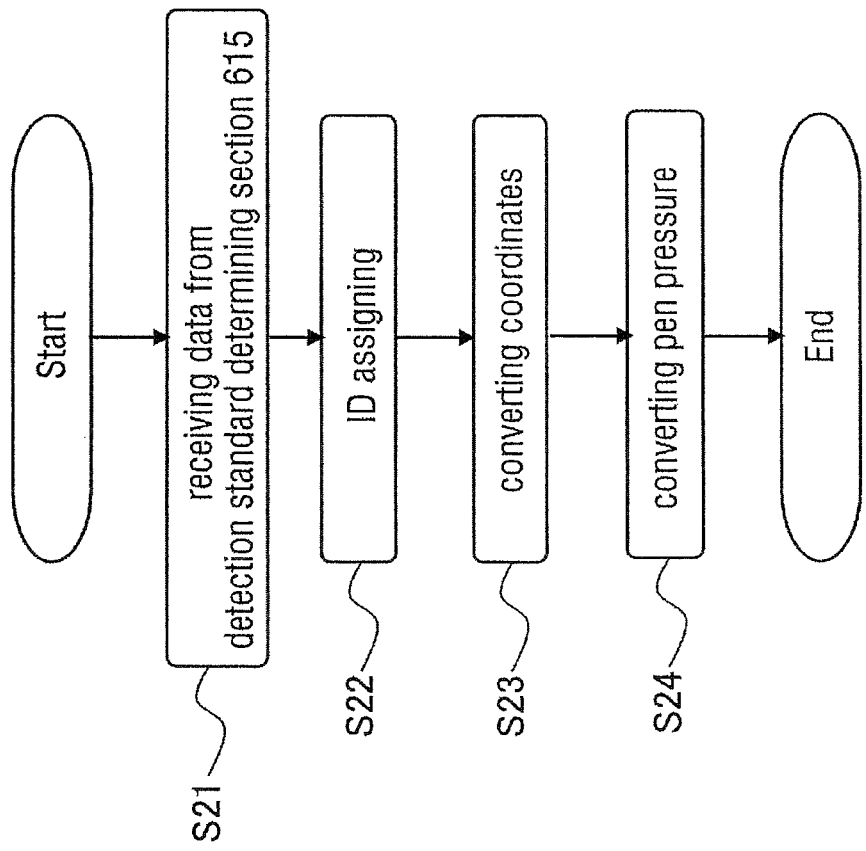
FIG. 7 is a flowchart for describing an operational example of strength correction processing of a positional information generating section of FIG. 2.

FIG. 7 is a flowchart for describing an operational example of strength correction processing of the positional information generating section 616 of FIG. 2.

As shown in FIG. 7, first, at step S21, the data receiving section 616A receives data from the detection standard determining section 615.

Next, at step S22, the ID assigning section 616B performs ID assigning processing for distinguishing a plurality of positions from each other upon detecting such a plurality of positions.

Subsequently, at step S23, the coordinate converting section 616C performs coordinate converting processing.

Subsequently, at step S24, the pen pressure converting section 616D performs pen pressure converting processing. The pen pressure converting section 616D coverts the absolute value information (z) of a capacitance value of the three-dimensional coordinates (x, y, z) into pen pressure data. After pen pressure processing, positional information generating processing ends.

Hereinafter, the surface data extracting processing, strength correction processing and pen pressure converting processing will be described in detail.
(Surface Data Extracting Processing)

Figure 8:
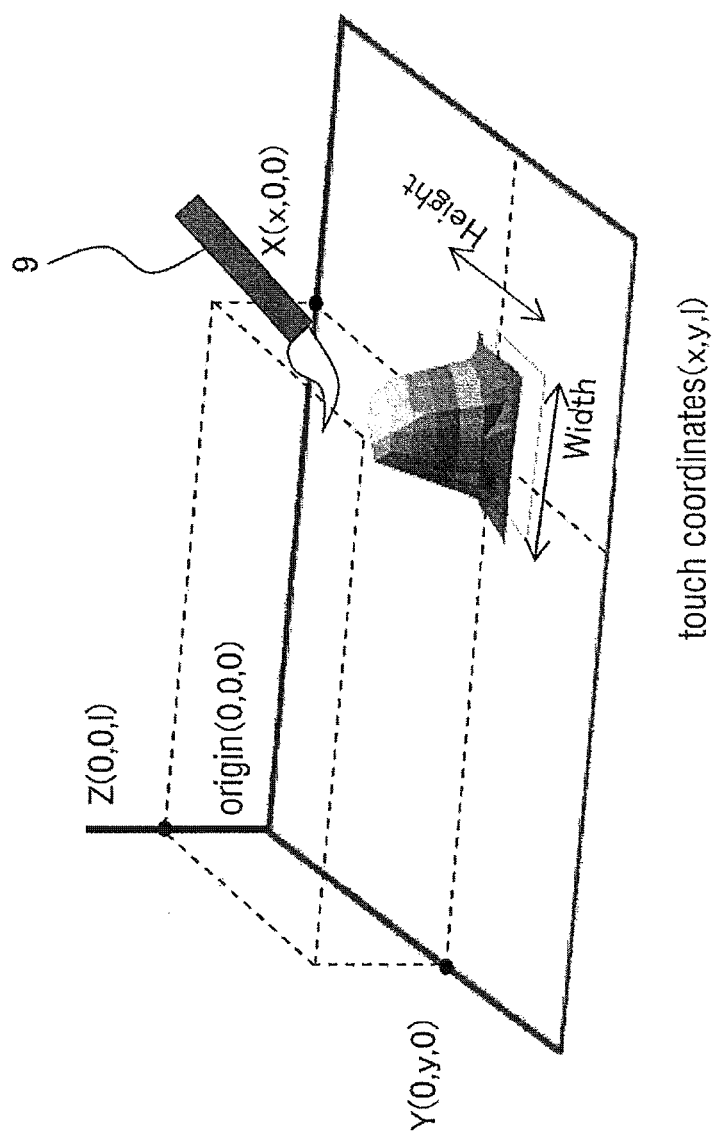
FIG. 8 is a schematic view showing capacitance distribution of the moment at which a brush-like touch pen 9 touches a touch panel 3.
Figure 9:
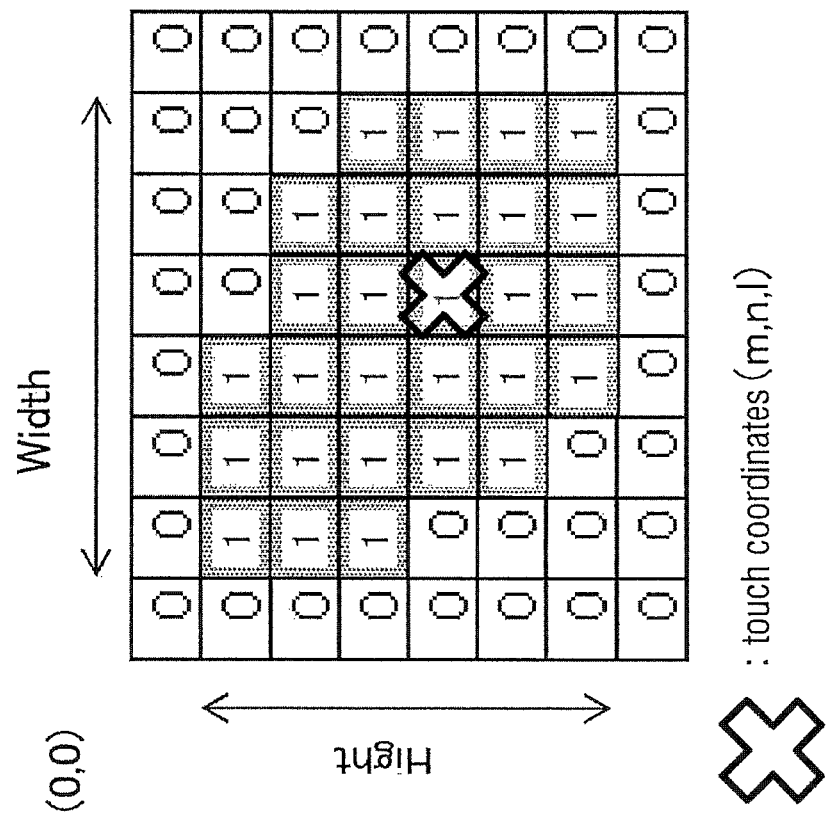
FIG. 9 is a diagram showing touch coordinates in a case when a brush-like touch pen touches and is detected on a touch panel of FIG. 2.

FIG. 8 is a schematic view showing capacitance distribution of the moment at which a brush-like touch pen 9 touches the touch panel 3. FIG. 9 is a diagram showing touch coordinates in a case when a brush-like touch pen 9 touches a touch panel 3.

As shown in FIG. 8 and FIG. 9, the touch pen 9 is a passive pen that does not have a battery or a communication apparatus, and the tip of the brush-like pen is constituted of an elastic brush body in which a large number of long and thin, hairy dielectrics are bundled with a conductive body (metal member). In summary, the touch pen 9 has a pen tip of a dielectric having an elastic body. As the pen tip of the brush-like touch pen 9 contacts the touch panel 3, the capacitance varies through the pen tip of the dielectric and the capacitance value on the surface of the touch panel increases. It is possible to detect stereoscopic, three-dimensional positional coordinate information (x, y, z)=(x, y, 1) consisting of a surface shape of capacitance reacted in accordance with the shape where the pen tip has contacted with the surface of the touch panel 3, i.e., electrode shape of the touch panel 3 which the pen tip contacted (shape in the sensor detected range of "1" in FIG. 9 at or above the threshold value of the detected capacitance value), a surface (x, y) at which the touch pen 9 contacts the surface of the touch panel 3, and a z value of the absolute value information (z) of a capacitance value. The surface (x, y), at which the touch pen 9 contacts the surface of the touch panel 3, can be extracted by simplifying the surface as surface information (W×H) of the width (Width) in the x direction and the height (Height) in the y direction. These make it possible to simply obtain the size of the capacitance value (strength) and the direction of the pen tip (or the direction of the brush, from the surface or shape thereof). In addition, it is possible to convert the surface information (W×H) into a capacitance value.

The surface shape in the sensor detected range of "1" in FIG. 9 is such that the surface shape varies more or less by cutting it out along the detection surface (x, y) with any strength (absolute value information (z)), with the mountain (which can be expressed stepwise with contour lines) of the strength (absolute value information (z)) of the capacitance value in FIG. 8 as a threshold value. Herein, as much as 10% of the height of the overall information of the capacitance value can be used as a threshold value. By cutting the middle (contour line) of the mountain of the strength (height) of the capacitance value in FIG. 8, the peripheral shape (contour line) is not influenced by the electrode shape and it becomes smooth compared to the surface shape in the sensor detected range of "1" in FIG. 9 in which as much as 0% of the height of the overall height of the capacitance value is cut as a threshold value. A variety of threshold values can be determined that can be expressed the most in accordance with the type of the brush-like touch pen 9. For example, if the threshold value is 50%, cutting is made along the contour line of the strength (information z of the capacitance value) of the 50% capacitance value. This threshold value needs to be determined at the position of the contour line of the strength (information z of the capacitance value) of the capacitance value at or more than the relationship with noise. It may be a value obtained by subtracting a predetermined value from a maximum value (peak value) of the strength (information z of the capacitance value) of the capacitance value. In this case, since strength correction will be performed next, the maximum value (peak value) of the strength (information z of the capacitance value) of the capacitance value will not be changed. Thus, the threshold value will not vary either. The positions lower than the threshold value are "0", while the positions higher than the threshold value are "1". As such, surface shapes obtained with the threshold value of subtraction or multiplication (0 to 100%) with regard to the capacitance value are used for displaying.

In FIG. 9, the "x" mark represents a gravity center coordinate position of touch coordinates (x, y, z). In FIG. 9, "1" denotes touch coordinates at which a capacitance value is detected. The shape defined by the "1"s in FIG. 9 is bounded in the following way: from the upper left hand corner, the boundaries are three units in the X and Y direction, one unit in the Y and X direction, two units in the X and Y direction, one unit in the Y and X direction, one unit in the X and Y direction and four units in the Y and X direction. As such, the surface and the shape information thereof are the surface shape of the capacitance reacted in accordance with the electrode shape (the shape of "1" in FIG. 9), and the surface shape of the width (Width) in the lateral direction and the height (Height) in the longitudinal direction.

Note that the direction of the pen tip (direction of the brush) of the brush-like touch pen 9 can also be extracted by extracting gravity center coordinates X1 of the touch coordinates obtained by subtracting N % or a specific numeral amount from the capacitance value of the gravity center coordinates X of the touch coordinates, and then by using the two points of the center coordinates X and gravity center coordinates X1. In addition, the direction or condition of the brush can be detected with the obtained surface shape used as a contour line.

Figure 10:
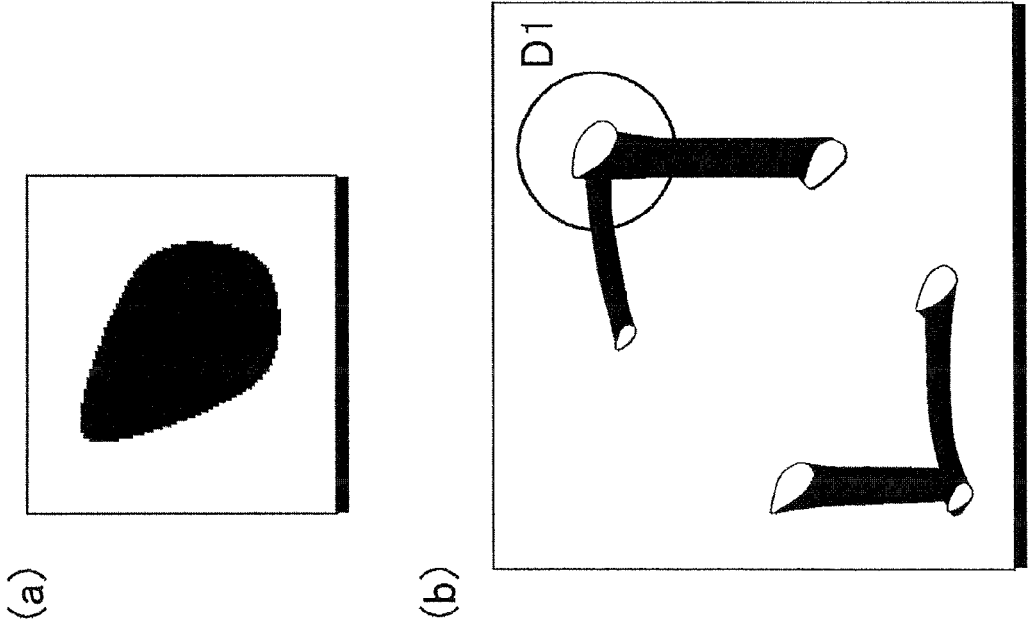
FIG. 10(a) and FIG. 10(b) are figures showing examples of image displays on a display screen of a display apparatus, performed by an application section of a host terminal with data from surface data extracting processing.

FIG. 10(a) and FIG. 10(b) are figures showing examples of image displays on a display screen of a display apparatus 2 performed by an application section of a host terminal 8 with data from surface data extracting processing.

As shown in FIG. 10(a) and FIG. 10(b), the application section of the host terminal 8 displays an image on the display screen of the display apparatus 2 based on the position (touch coordinates) of the indicator that is touch-detected. In summary, symbols and letters are conventionally drawn with a group of circles of which the circle diameters are successively changed in accordance with the z value (absolute value information (z)) of the three-dimensional coordinates (x, y, z) of a capacitance, with the touch coordinates as the center. In Embodiment 1, however, a sequence of contacting surface shapes formed by the tip section of the brush-like touch pen 9 contacting the surface of the touch panel 3, i.e., shapes of capacitance reacted in accordance with the electrode shape of the touch panel 3 which the pen tip contacted (shape in the sensor detected range of the detected capacitance value; brush shapes of D1 in FIG. 10(a) and FIG. 10(b)), draw symbols and letters on the display screen. Thus, as the surface of the touch panel 3 which the pen tip contacts becomes smaller, the boldness of the line to be drawn will also be thinner.

Note that a surface shape can be extracted (1 bit) from capacitance values exceeding a certain threshold value and the touch coordinate group "1", while a solid (mountain shape) may be extracted (2 bits to multiple bits) from capacitance values exceeding a certain threshold value and the touch coordinate group thereof.

With the configuration described above, operational examples of the coordinate value, capacitance value and surface extracting processing performed by the surface data extracting section 615E of FIG. 3 will be further described in detail.

Figure 11:
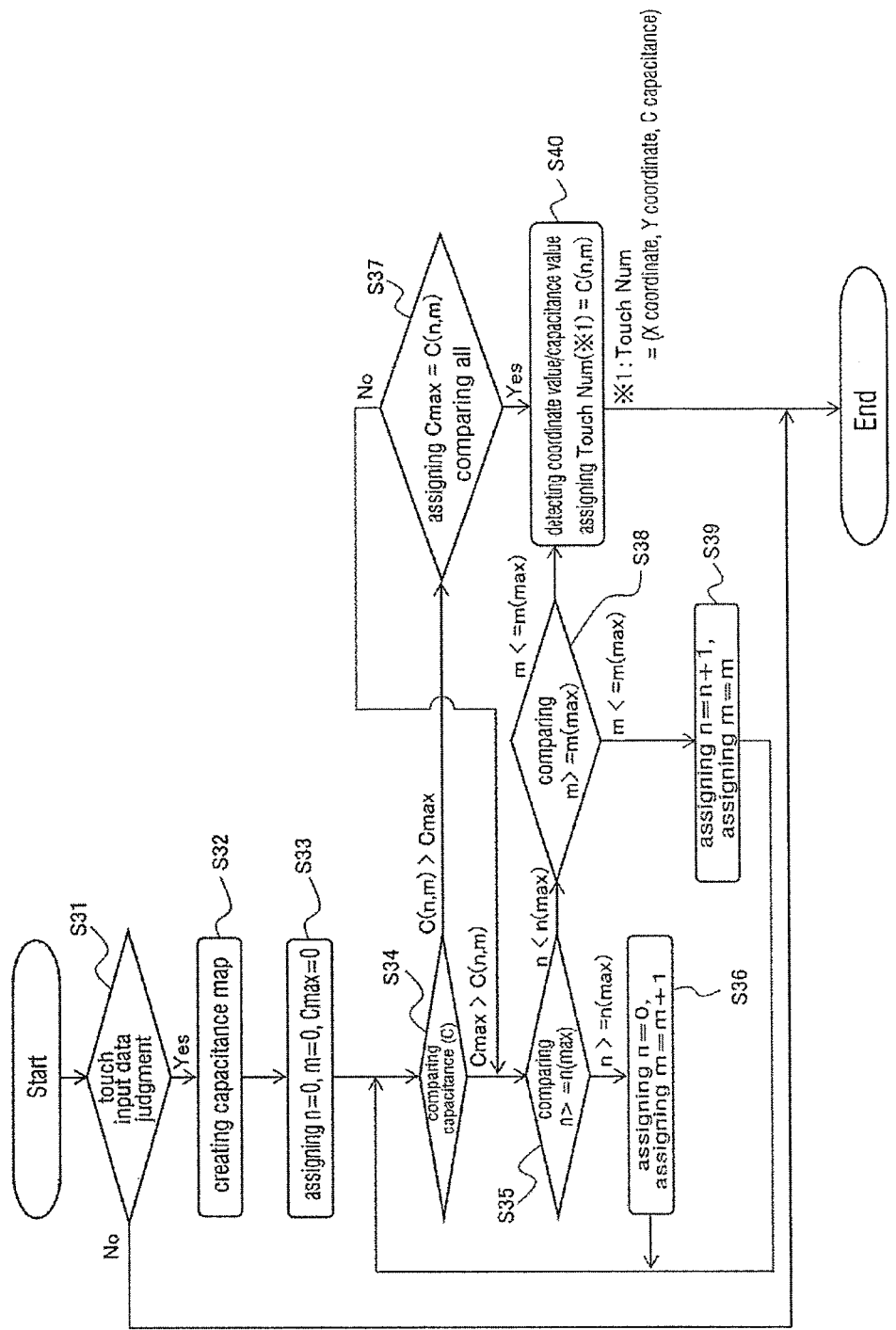
FIG. 11 is a flowchart showing an operational example of coordinate value and capacitance value extracting processing at a surface data extracting section of FIG. 3.
Figure 12:
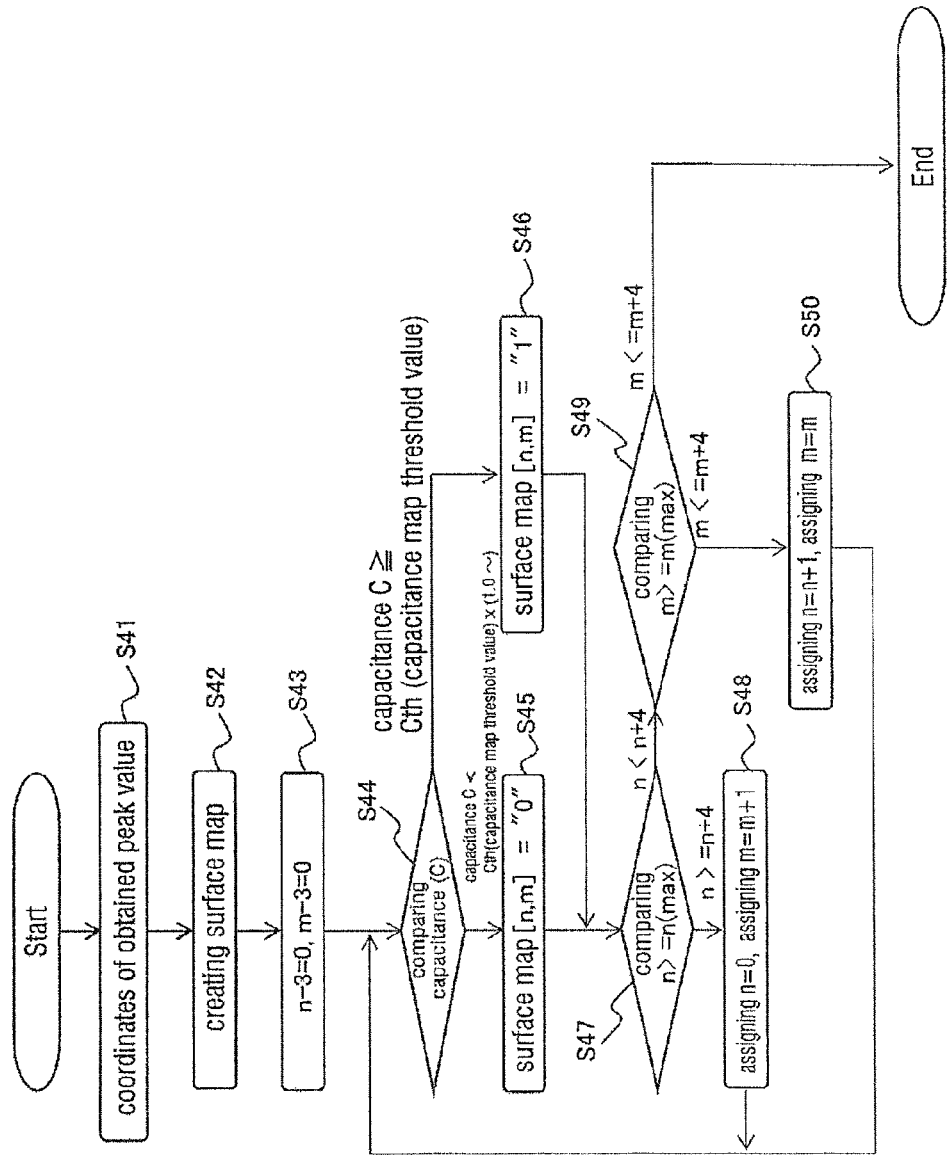
FIG. 12 is a flowchart showing an operational example of performing surface extracting processing from an operation of coordinate value and capacitance value extracting processing at a surface data extracting section of FIG. 3.

FIG. 11 is a flowchart showing an operational example of coordinate value and capacitance value extracting processing at the surface data extracting section 615E of FIG. 3. FIG. 12 is a flowchart showing an operational example of performing surface extracting processing from an operation of coordinate value and capacitance value extracting processing at the surface data extracting section 615E of FIG. 3.

Figure 13:
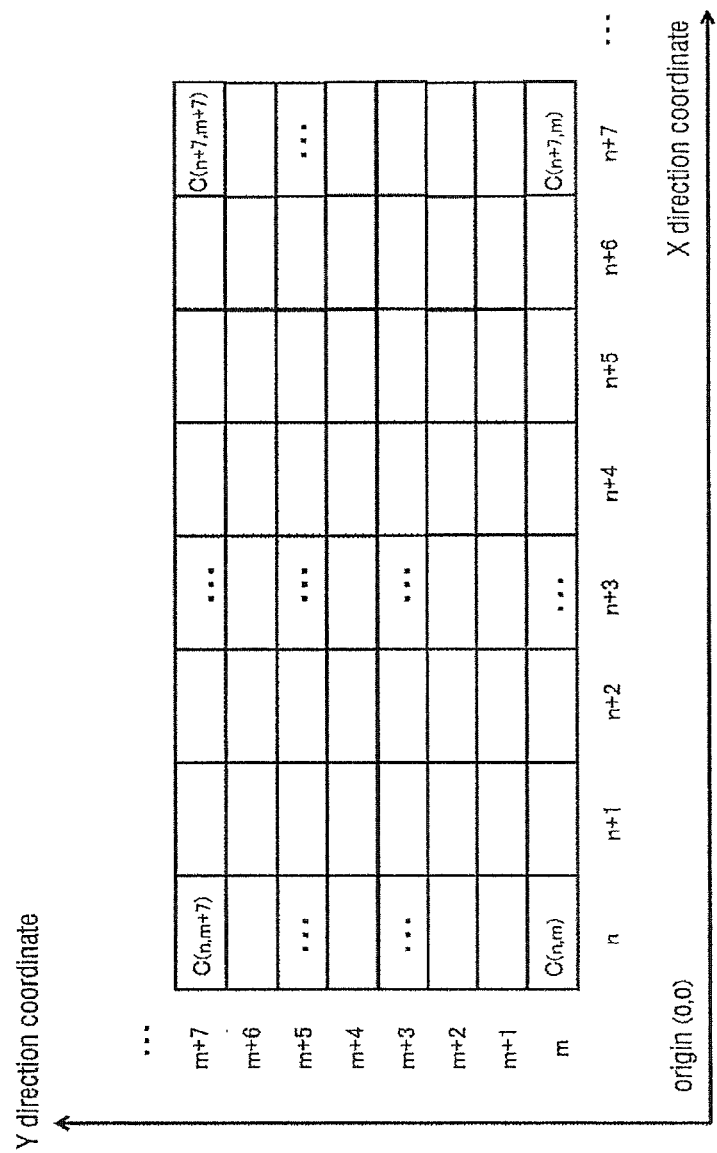
FIG. 13 is a diagram showing a capacitance map of an overall sensor area of a touch panel of FIG. 1.

As shown in FIG. 11, first, at step S31, touch input judging processing is performed. If the judging result is touch input "no" (No), then the processing ends and the processing is paused until there is a touch input. If the judging result is touch input "yes" (Yes), then capacitance map creating processing is performed at step S32. In the capacitance map creating processing, a capacitance map of the overall sensor area of the touch panel 3 is created as shown in FIG. 13.

Next, at step S33, n=0, m=0, and Cmax=0 are assigned in a capacitance C (n, m) map of m rows and n columns corresponding to coordinate positions arranged in a matrix.

Thus, for example, the first column is defined to be capacitance C (0, 0) to C (0, m), the second column is defined to be capacitance C (1, 0) to C (1, m) . . . the m-th column is defined to be capacitance C (n, 0) to C (n, m).

Subsequently, at steps S34 to S40, from the capacitance C (m, n) map of m rows and n columns in a matrix, the capacitance value C (n, m) at those coordinates are successively compared with a current peak coordinate value Cmax (n, m) to detect a peak coordinate value Cmax (n, m) in all the capacitance values C (n, m).

Furthermore, as shown in FIG. 12, first, at step S41, the peak capacitance coordinate Cmax (n, m) of all the capacitance values C (n, m) obtained at step S40 is retrieved.

Figure 14:
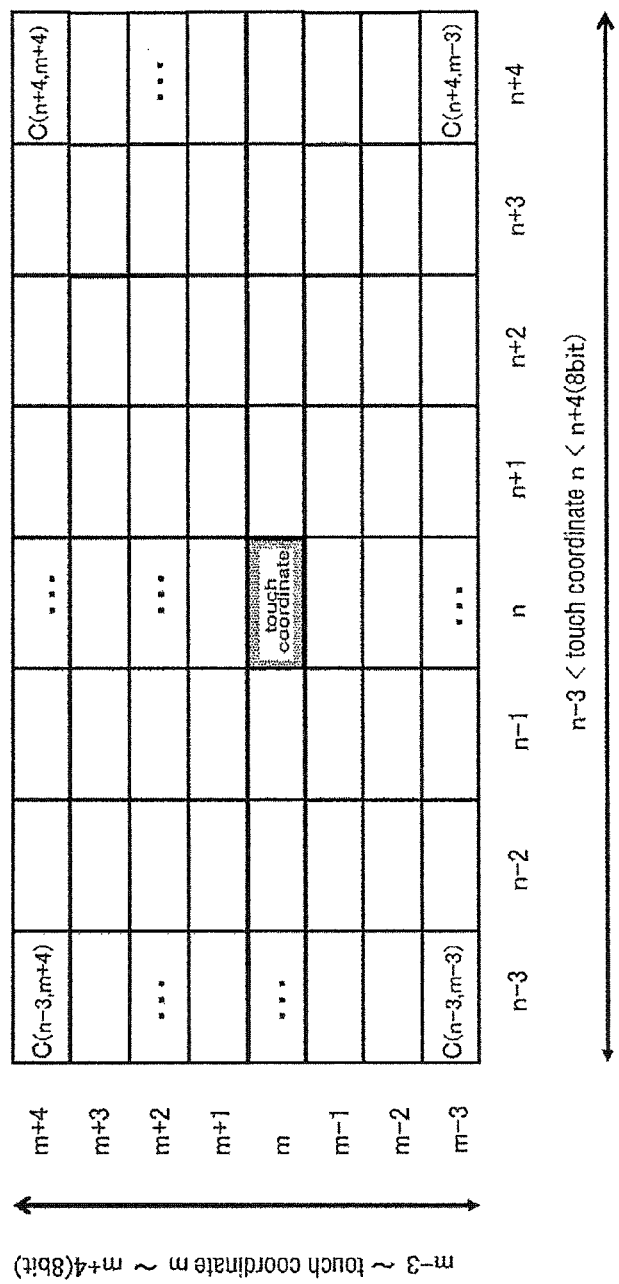
FIG. 14 is a diagram showing a surface map of a predetermined area with a peak capacitance coordinate Cmax (n, m) of all the capacitance values C (n, m) as touch coordinates positioned at the center of the map, including a periphery thereof.

At the following step S42, a surface map of a predetermined area is created in such a manner that the peak coordinate value Cmax (n, m) of all the capacitance values C (n, m) is positioned as touch coordinates at the center of the map, as shown in FIG. 14. Specifically, a surface map is created with the range of top (+4), bottom (−3), right (+4) and left (−3) from the peak coordinate value Cmax (n, m).

Subsequently, at step S43, n−3=0 and m−3=0 are assigned in, for example, a capacitance C (n−3, m−3) of 8 rows and 8 columns arranged in a matrix in a predetermined area. Thus, for example, the first column is defined to be capacitance C (0, 0) to C (0, 7), the second column is defined to be capacitance C (1, 0) to C (1, 7) . . . the eighth column is defined to be capacitance C (7, 0) to C (7, 7).

Thereafter, at step S44, it is judged as to whether or not the capacitance value C (n, m) of the surface map of the extracted predetermined area is greater than Cth (capacitance map threshold value). At step S44, if each capacitance value C (n, m) in the surface map is greater than the Cth (capacitance map threshold value), it is defined to be a capacitance detected region "1" at step S46; and if each capacitance value C (n, m) is smaller than the Cth (capacitance map threshold value), it is defined to be a capacitance undetected area "0".

Figure 15:
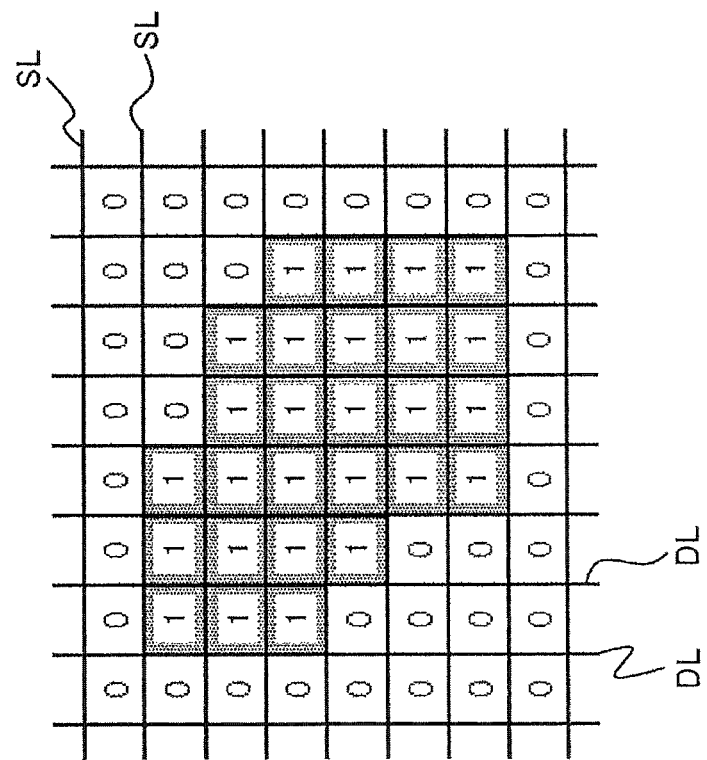
FIG. 15 is a diagram showing a shape of a contacting surface of a brush-like touch pen contacting a touch panel of FIG. 2.

At steps S47 to S50, the capacitance detected regions "1" and the capacitance undetected areas "0" are sorted out from the full surface map of a capacitance C (m, n) of 8 rows and 8 columns in a matrix; and a surface map is created on which the capacitance detected regions "1" and the capacitance undetected areas "0" are sorted out in respective lattice regions of 8 rows and 8 columns of a plurality of drive lines DL and a plurality of sense lines SL, as shown in FIG. 15.

From the foregoing, the operation of the surface data extracting section 615E comprises: a peak capacitance coordinate detecting step at which a peak capacitance coordinate detecting means (not shown) detects a peak capacitance coordinate Cmax (n, m) from a capacitance C (n, m) map of m rows and n columns arranged in a matrix; and a surface map forming step at which a surface map forming means (not shown) creates a predetermined area with the peak capacitance coordinate Cmax (n, m) detected by the peak capacitance coordinate detecting means as an input position (x, y) to be positioned at the center of a map, compares each capacitance value C (n, m) of the extracted predetermined area with a predetermined threshold value, and extracts a surface shape and/or surface information in the sensor detected coordinate range at or above the predetermined threshold value as a surface map.

Therefore, according to Embodiment 1, comprised is a touch panel system 1 for performing displaying corresponding to three-dimensional coordinates (x, y, z) of a capacitance value, including absolute value information (z) of a capacitance value obtained by indicating an input position (x, y) of an indicator to a touch panel 3, wherein a detection standard determining section 615 within a controller section 6 comprises a surface data extracting section 615E for extracting a shape of the indicator contacting or approaching a surface of the touch panel 3 as surface data.

Figure 16:
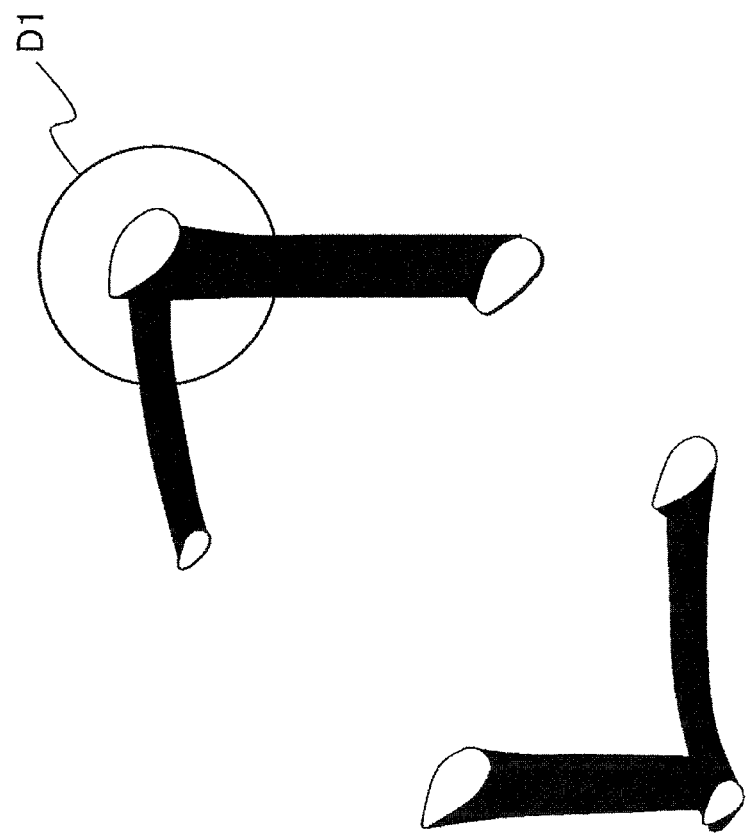
FIG. 16 is a figure for describing a state in which a shape of a contacting surface of a brush-like touch pen contacting a touch panel of FIG. 2 is reflected on a letter drawn on a display screen.

As such, a planar view shape of the indicator (brush-like touch pen 9) contacting or approaching the surface of the touch panel 3 is extracted as surface data by the surface data extracting processing performed by the surface data extracting section 615E of FIG. 3. Thus, change in the indicator shape, e.g., contacting shape D1 shown in FIG. 16 on an upper surface of the touch panel 3 by a finger or a brush-like touch pen 9, can be reflected on symbols and letters, allowing the symbols and letters to have individuality and to be drawn on the display screen. That is, boldness and drawing shapes of symbols and letters can be expressed more clearly, and the drawing shapes of the symbols and letters can have reality and individuality.

(Strength Correction Processing)

Figure 17:
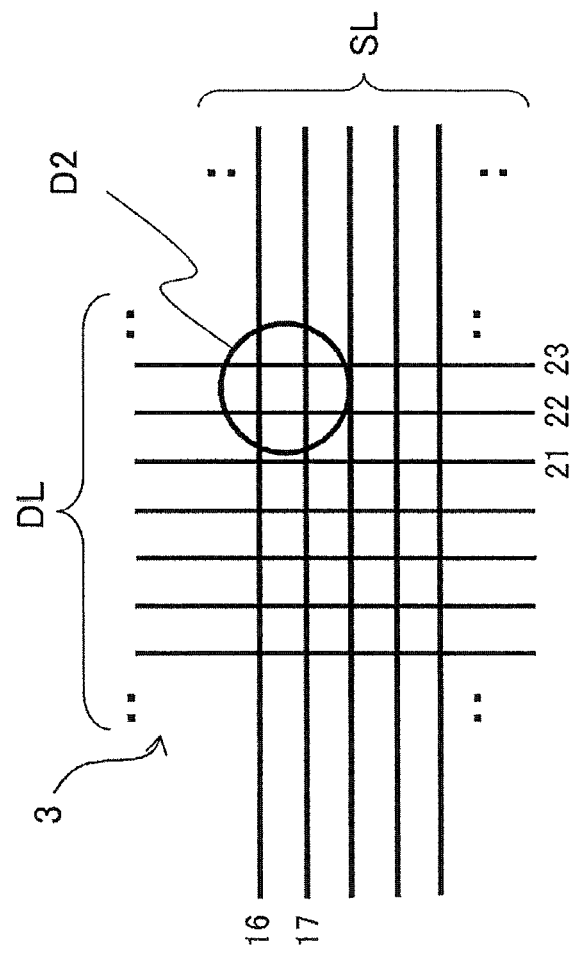
FIG. 17 is a partial planar view schematically showing a scene in which image equivalent lines of a plurality of drive lines DL and a plurality of sense lines SL intersect orthogonally in a lattice form at a touch panel.
Figure 18:
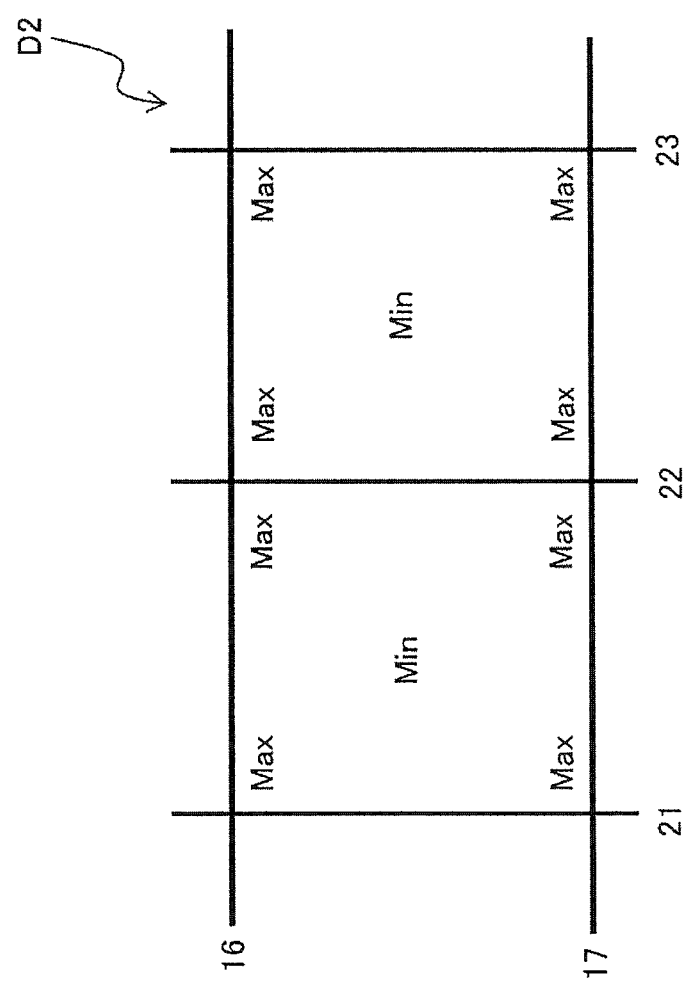
FIG. 18 is a figure with an enlarged D2 section of FIG. 17, showing a capacitance value at its maximum (Max) and its minimum (Min).
Figure 19:
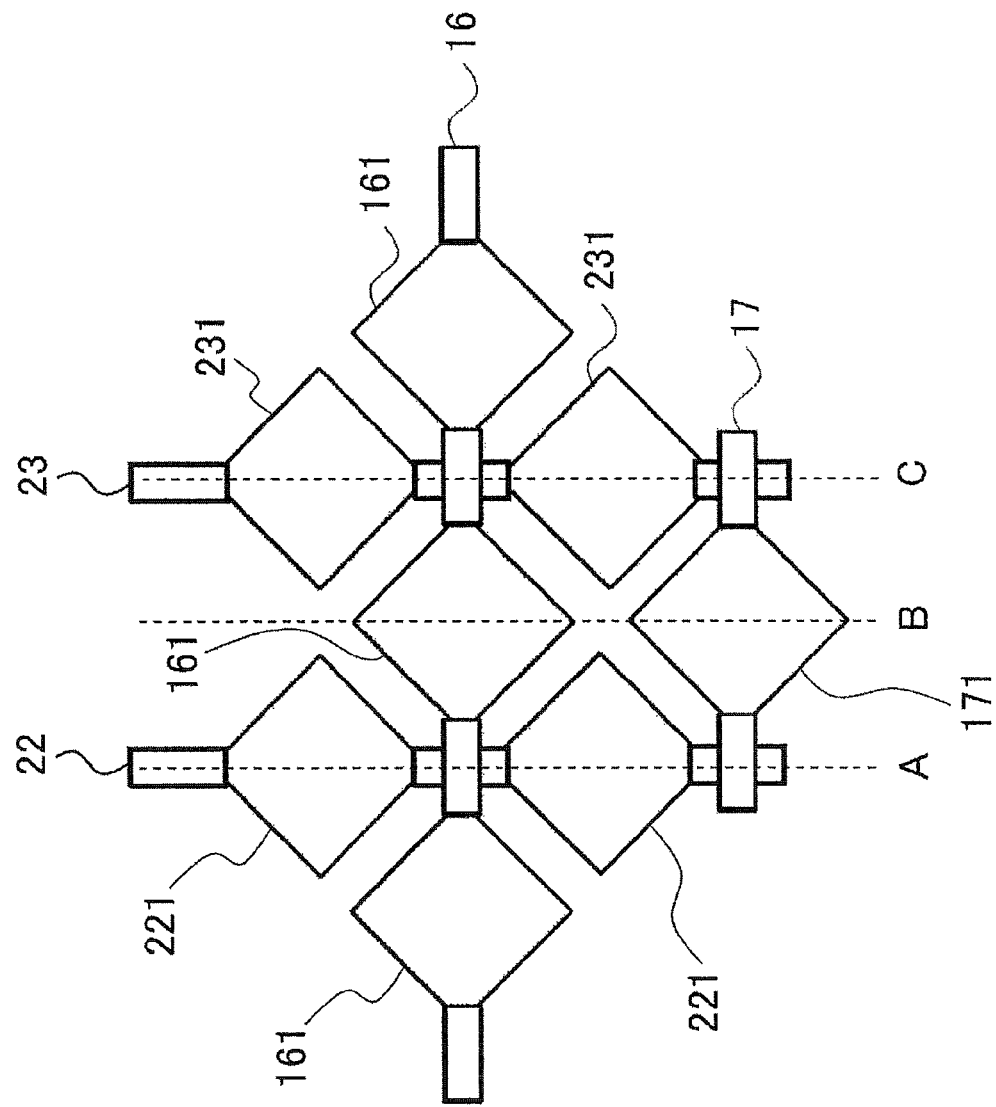
FIG. 19 is a partial planar view specifically showing a scene in which image equivalent lines of a plurality of drive lines DL and image equivalent lines of a plurality of sense lines SL intersect orthogonally in a lattice form.

FIG. 17 is a partial planar view schematically showing a scene in which image equivalent lines of a plurality of drive lines DL and a plurality of sense lines SL intersect orthogonally in a lattice form at a touch panel 3. FIG. 18 is a figure with an enlarged D2 section of FIG. 17, showing a capacitance value at its maximum (Max) and its minimum (Min). FIG. 19 is a partial planar view specifically showing a scene in which image equivalent lines 22, 23 of a plurality of drive lines DL and image equivalent lines 16, 17 of a plurality of sense lines SL intersect orthogonally in a lattice form.

As shown in FIG. 17 to FIG. 19, image equivalent lines 22, 23, with which rhomboid electrodes 221, 231 in a planar view and connecting sections of a plurality of drive lines DL are alternately and successively connected, functioning as longitudinal Y wiring provided in parallel with each other and each driven by a drive signal provided thereto, and image equivalent lines 16, 17, with which rhomboid electrodes 161, 171 in a planar view and connecting sections of a plurality of sense lines SL are alternately and successively connected, functioning as lateral X wiring provided in parallel with each other and outputting an output signal indicating a change in a capacitance, are arranged in such a manner to cross sterically at their connecting sections. Note that the space between the drive lines DL and the space between the sense lines SL is about 5 mm.

Thus, in unit lattices formed by the longitudinal image equivalent lines 22, 23 and the lateral image equivalent lines 16, 17, respective vertex portions of four triangles (half of the rhombus) of the electrodes 161, 171 and the electrodes 221, 231 protrude from the respective sides of the lattices towards the center portion within the unit lattice region. In FIG. 18, the capacitance value indicates its minimum (Min) at the center portion of the unit lattice region of a quadrilateral in a planar view, while the capacitance value indicates its maximum (Max) in the periphery of the unit lattice region. Thus, capacitance values to be detected vary even within the same unit lattice region.

Figure 20:
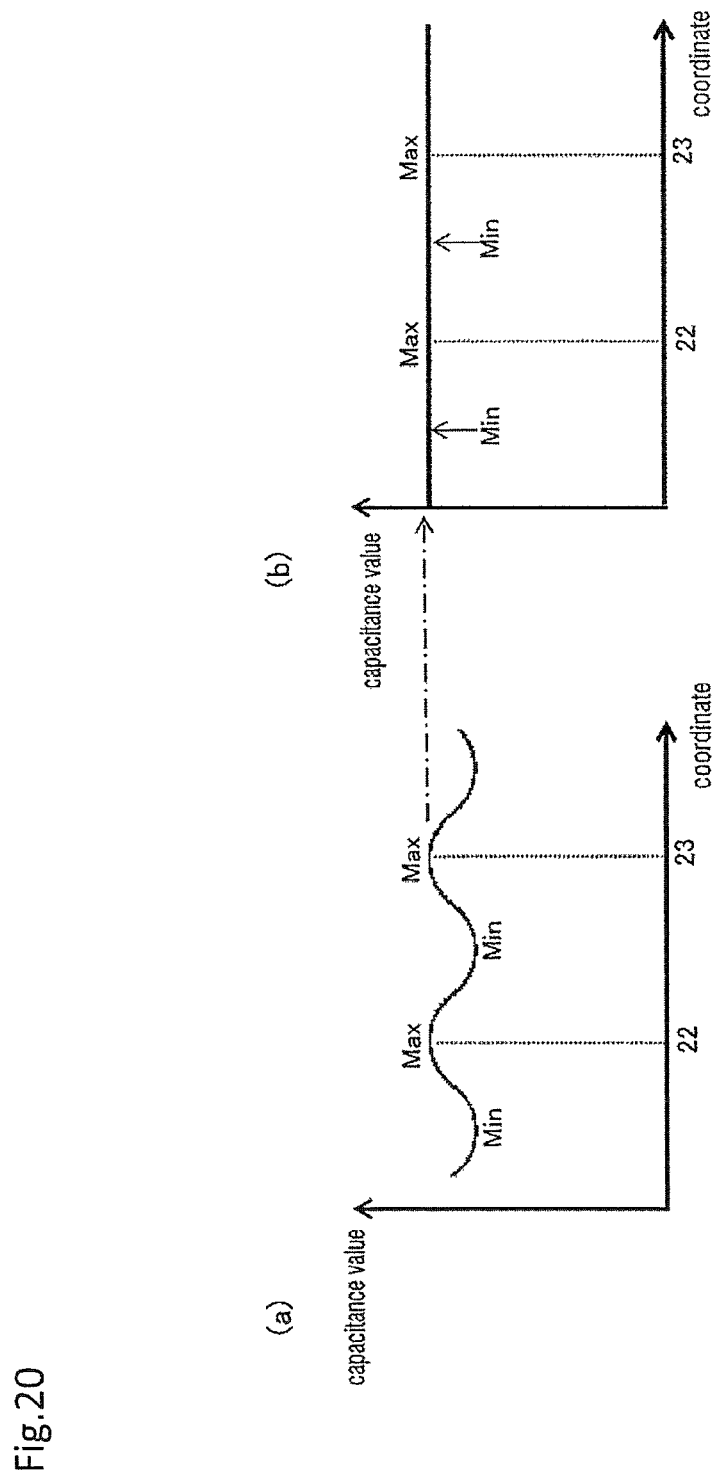
FIG. 20(a) is a figure showing a state of variation of a capacitance value with regard to a coordinate position prior to strength correction processing for a capacitance.
FIG. 20(b) is a figure showing a state of a capacitance value with regard to a coordinate position after strength correction processing for a capacitance.

FIG. 20(a) is a figure showing a state of variation of a capacitance value with regard to a coordinate position prior to strength correction processing for a capacitance. FIG. 20(b) is a figure showing a state of a capacitance value with regard to a coordinate position after strength correction processing for a capacitance.

As shown in FIG. 20(a), the capacitance value indicates its maximum (Max) every time an image equivalent line laterally crosses over the longitudinal image equivalent lines 22, 23 in the unit lattice region of a quadrilateral in a planar view in FIG. 18, while the capacitance value indicates its minimum (Min) at the center portion between the image equivalent lines 22, 23, which indication is repeated periodically. As such, detected capacitance values vary depending on the positions. A capacitance value curve with periodicity of every time an image equivalent line laterally crosses over the longitudinal image equivalent lines 22, 23, is formed.

For the capacitance value curve with periodicity, as shown in FIG. 20(b), the strength correcting section 615F of the detection standard determining section 615 performs strength correction processing so that the capacitance value in FIG. 20(a) at its minimum (Min) value corresponds to the capacitance value at its maximum (Max) value, thus forming a straight line of a linear capacitance value property. In summary, the correction is performed so that there will be no periodic variation in accordance with the surface or shape (position) of the electrodes of the touch panel 3 to form a constant capacitance value to be detected.

With regard to the distribution of three-dimensional coordinates (x, y, z) of a capacitance value that periodically varies in accordance with the positions within the detected surface obtained from respective output signals of the touch panel 3, the strength correcting section 615F performs strength-correcting on a capacitance property with which the z coordinate value (z value) periodically varies so that it will be a uniform capacitance value property, with regard to at least one direction of the x and y directions of the detected surface.

As a result, upon outputting output signals in accordance with the change in a capacitance due to the presence or absence of a contacting or approaching indicator (such as a finger or a touch pen), formed in a part with drive lines DL as a result of the driving of the drive lines DL, the correction is performed for a constant capacitance value regardless of the position of the longitudinal image equivalent lines 22, 23. As a result, the capacitance value upon touching and the difference values thereof from the threshold value becomes the same as to prevent the accuracy of the touch coordinate detection from lowering, thus equalizing the accuracy of the touch coordinate detection.

In summary, the capacitance value to be detected becomes smaller and is decreased towards the center of the unit lattice region of a quadrilateral in a planar view. Conventionally, whether or not the detected capacitance value exceeds a threshold value is emphasized. Even if touching is made at the same coordinates (region within the same unit lattice), there are variations occurring in the difference values between the threshold value and the capacitance value to be detected, and as a result, the touch coordinate detection accuracy is not equalized. On the other hand, according to Embodiment 1, the difference values from capacitance values to be detected beyond the threshold value are equalized (flattened). That is, at the same coordinate position (region within the same unit lattice), every time touching is made, the difference values between the threshold value and capacitance values to be detected can be equalized (flattened).

With the configuration described above, the operation thereof will be described hereinafter.

Figure 21:
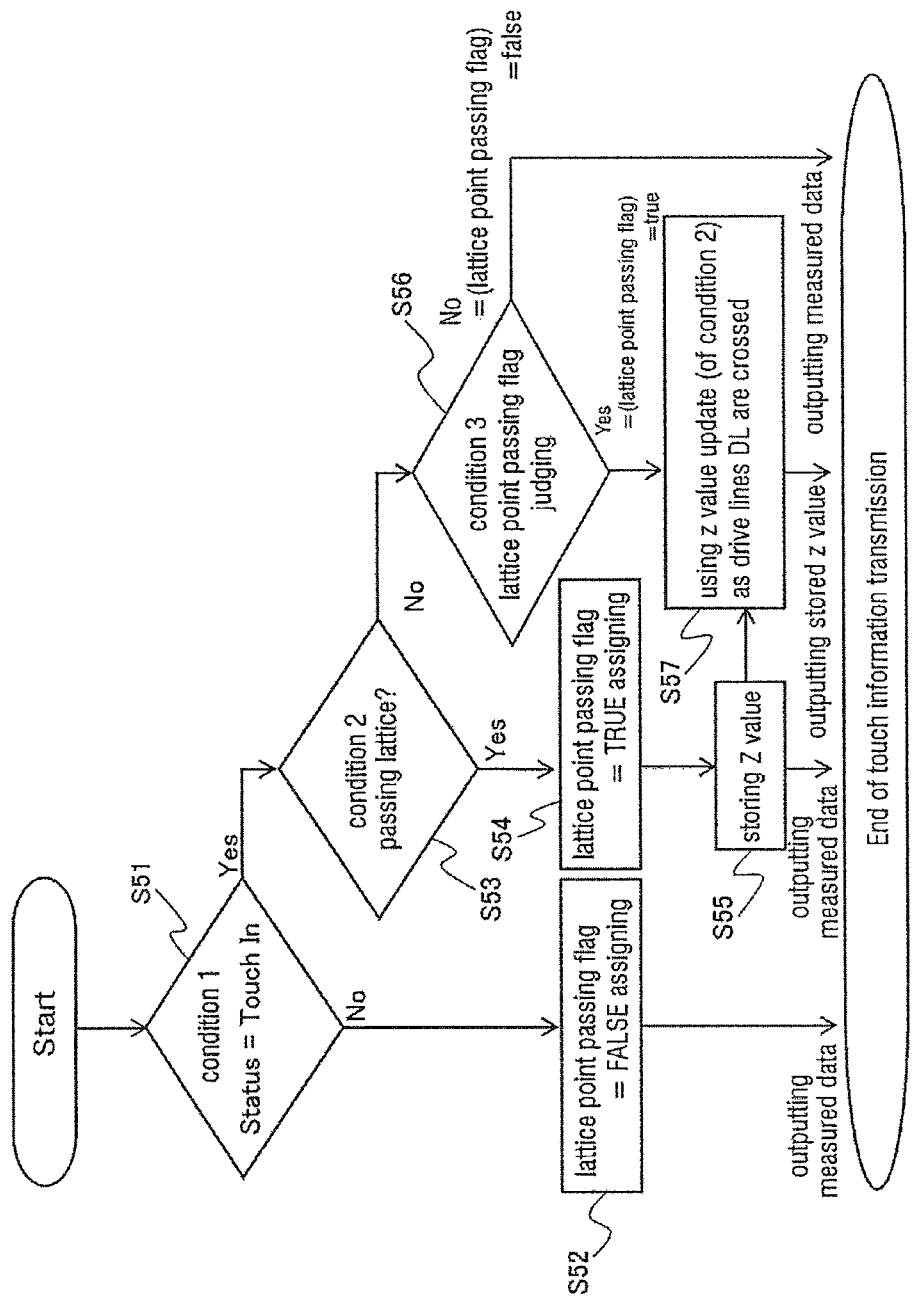
FIG. 21 is a flowchart showing an operational example of strength correction processing for a capacitance value performed by a strength correcting section of FIG. 3.

FIG. 21 is a flowchart showing an operational example of strength correction processing for a capacitance value performed by a strength correcting section 615F of FIG. 3.

As shown in FIG. 21, first, at step S51, whether or not there has been a touch using an indicator (such as a finger or a touch pen) to a touch panel 3 is judged.

Next, if there is no touching (No) at step S51, then a lattice point passing flag is determined to be "false" and measured data from the surface data extracting section 615E are output directly at step S52. The lattice point passing refers to a concept of as to whether or not there has been a passing over a longitudinal and/or lateral image equivalent line.

Figure 22:
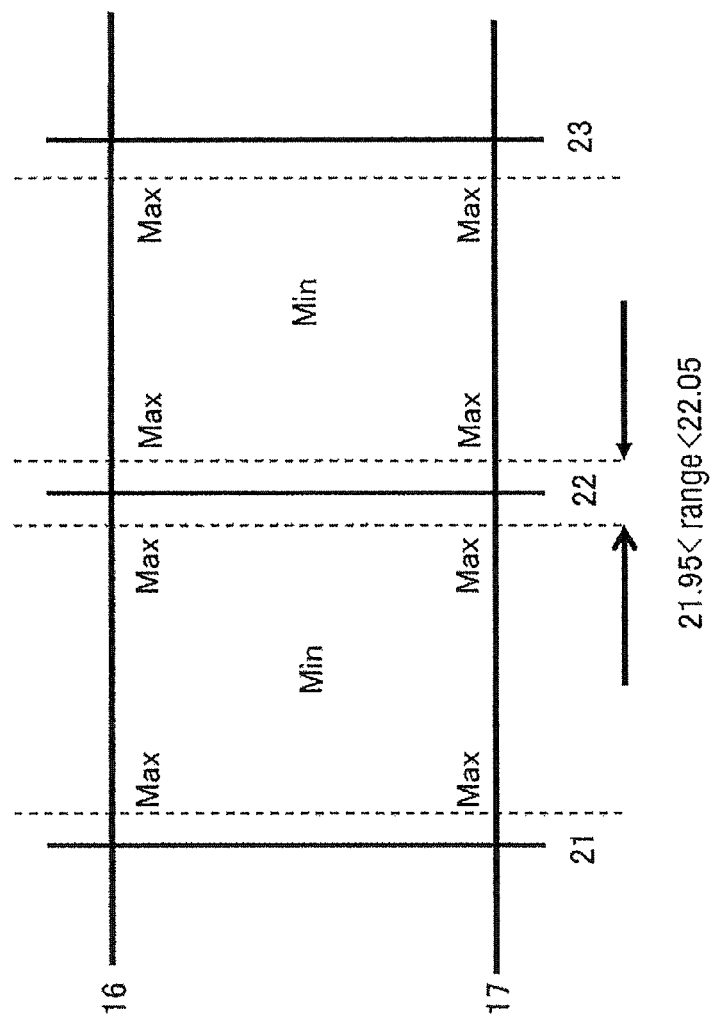
FIG. 22 is a diagram describing a range example where drive lines DL laterally pass over longitudinal image equivalent lines.

Subsequently, if there is touching (Yes) at step S51, whether or not lattice point passing is made is judged at step S53. With regard to the range of the passing in the lateral direction over the longitudinal image equivalent line 22 of the drive lines DL, judgment is made as to whether or not the lattice point passing is made at or more than the coordinate position 21.95 of the image equivalent line and at or less than the coordinate position 22.05 of the image equivalent line as shown in FIG. 22. If the lattice point passing is made (Yes) at step S53, then the lattice point passing flag is determined to be "True" at step S54 and the z value of the touch three-dimensional coordinates (x, y, z) is stored. At step S55, measured data from the surface data extracting section 615E at that time are output directly.

Thereafter, if there is no lattice point passing (No) at step S53, it is judged at step S56 as to whether or not the lattice point passing flag was "True" immediately before.

Furthermore, at step S56, if the lattice point passing flag was "True" immediately before (Yes), the z value of the touch three-dimensional coordinates (x, y, z) stored at step S55 is used, as the case after the lattice point passing after the crossing of the image equivalent line 22 immediately before, and the stored z value is output instead of measured data. In addition, at step S56, if the lattice point passing flag was "false" immediately before (No), then there is no z value that was stored immediately before, and the measured data is output directly.

In summary, the strength correcting section 615F of FIG. 3 monitors specific coordinates (coordinate values at or more than 21.95 of the image equivalent line and at or less than 22.05 of the image equivalent line), and stores (updates) a z value in the case of a range within the monitoring range, and uses a z value stored immediately before in the case of a range other than the specific coordinates, to correct a capacitance value. This is shown in FIG. 23(b).

From the foregoing, the strength correcting section 615F is provided with a storing section, monitors a periodic, specific coordinate range of at least one direction of the x and y directions of a detection surface (x, y), updates absolute value information (z) of a specific coordinate range on a storing section (not shown), and uses the absolute value information (z) stored on the storing section (not shown) immediately before for a coordinate range other than the specific coordinate range to correct the capacitance value.

Figure 23:
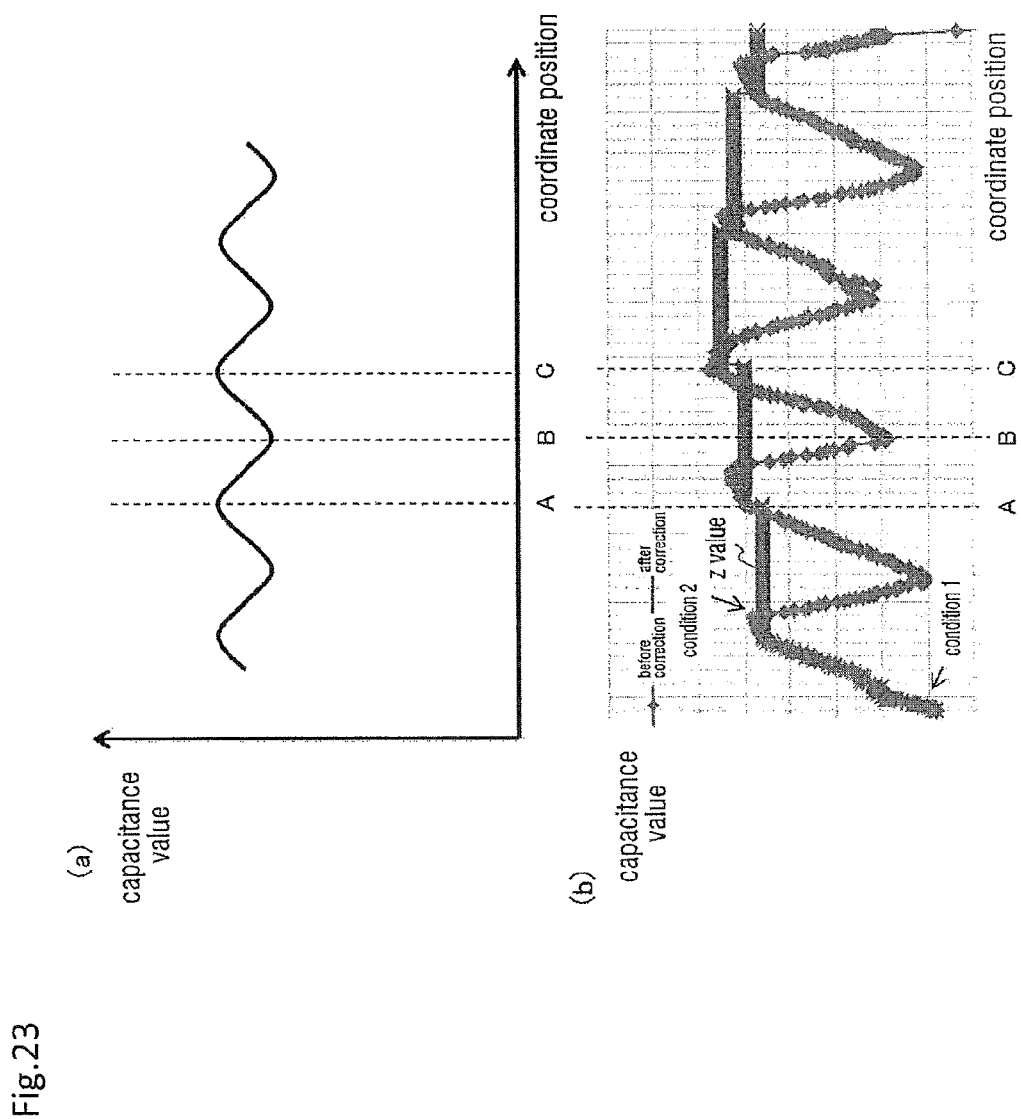
FIG. 23(a) is a graph showing a state of variation of a capacitance value before strength correction processing at specific lateral direction coordinate positions A to C of FIG. 19.
FIG. 23(b) is a graph showing a measured value of the case that a state of a capacitance value after strength correction processing at specific lateral direction coordinate positions A to C of FIG. 19 is added to FIG. 23(a).

FIG. 23(a) is a graph showing a state of variation of a capacitance value before strength correction processing at specific lateral direction coordinate positions A to C of FIG. 19. FIG. 23(b) is a graph showing a measured value of the case that a state of a capacitance value after strength correction processing at specific lateral direction coordinate positions A to C of FIG. 19 is added to FIG. 23(a). Note that the moment of touching is shown with the condition 1, and a lattice point passing time is shown with the condition 2.

As shown in FIG. 23(b), if there is no touch using an indicator (such as a finger or a touch pen) to the touch panel 3 (where the lattice point passing flag is "false" under the condition 1), measured data are output directly. If there is a touch and the touch passes the lattice point (where the lattice point passing flag is "True" under the condition 2), the z value of the three-dimensional coordinates (x, y, z) as the touch coordinates at that time is stored and the measured data are output directly. Furthermore, thereafter, in the case other than the lattice point passing, that is, after the passing of the lattice point, the stored z value is output instead of the measured data.

In summary, the strength correcting section 615F monitors a periodic, specific coordinate range of at least one direction of the x and y directions of a detection surface, updates a z coordinate value with regard to the specific coordinate range, and uses a z coordinate value stored immediately before for a coordinate range other than the specific coordinate range to correct a capacitance value. As a result, it becomes possible to obtain a uniform capacitance property in such a manner to correspond to a peak capacitance value that periodically varies in accordance with a predetermined position within the detection surface.

Note that averaging may be performed a certain determined number of times on the updated z value and a capacitance value may be corrected with the averaged z value. As a result, the registered z value can be uniformed even more. Furthermore, for the strength correction processing, a capacitance value may be corrected using one dimension (X coordinate or Y coordinate) or two dimensions (X coordinate and Y coordinate).

Next, a case will be described with reference to FIG. 24 and FIG. 26, where a correction parameter (table) is stored on a memory (storing section) and the strength correcting section 615F performs strength correction processing while referring to the correction parameter (table).

Figure 24:
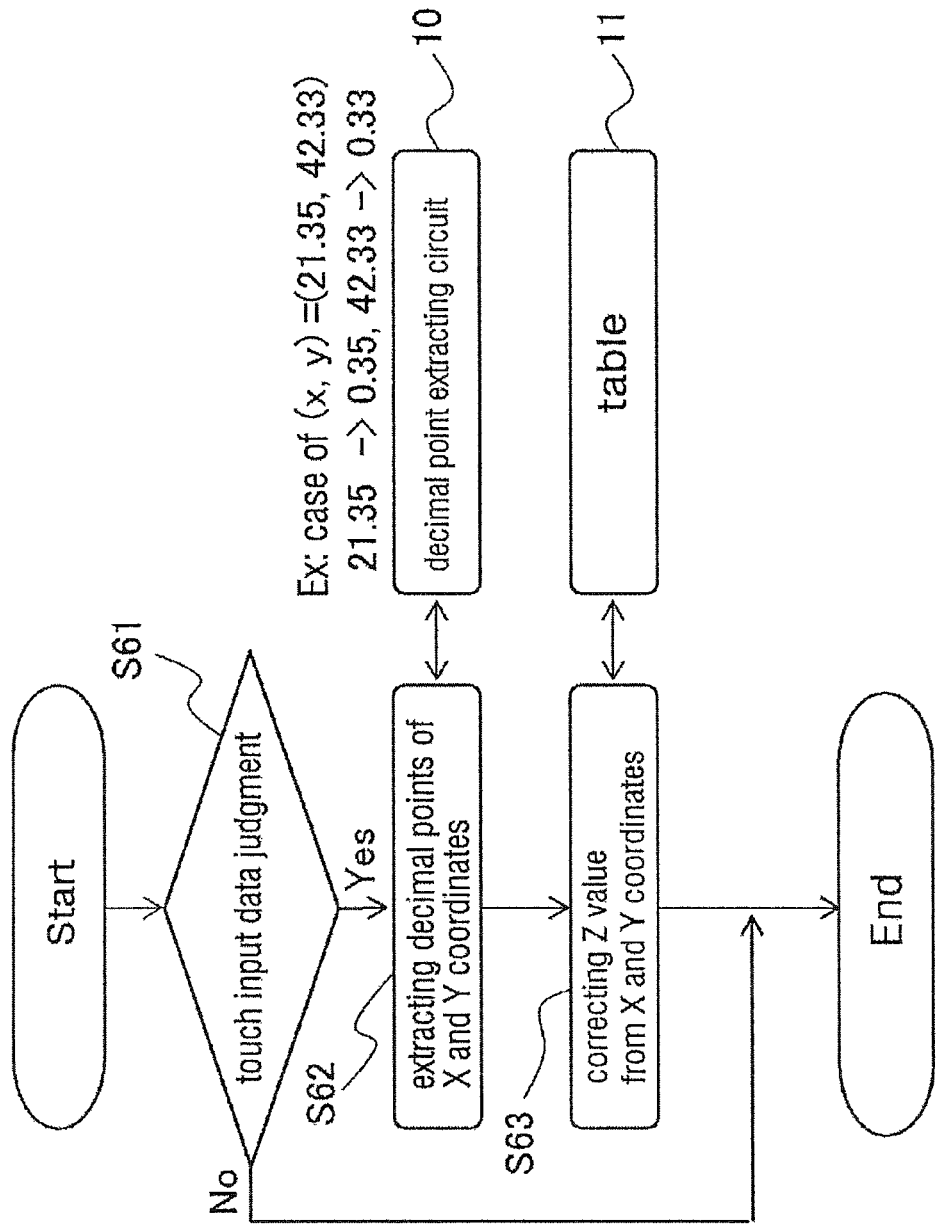
FIG. 24 is a flowchart showing a case example in which a strength correcting section of FIG. 3 performs strength correction processing while referring to a single correction parameter (table).

FIG. 24 is a flowchart showing a case that the strength correcting section 615F of FIG. 3 performs strength correction processing while referring to a single correction parameter (table).

As shown in FIG. 24, first, touch input judging processing is performed at step S61. If the judging result is touch input "no" (No), processing ends and the process is paused until there is a touch input. If the judging result is touch input "yes" (Yes), then at step S62, the strength correcting section 615F extracts decimal points at X coordinate and Y coordinate positions using a decimal point extracting circuit 10. Herein, decimal point X coordinate and Y coordinate are defined as (x, y)=(21.35, 43.33).

Next, at step S63, the strength correcting section 615F corrects the z value from the decimal point X coordinate and Y coordinate. The correction of the z value extracts a rate "1.2" at which the decimal point X coordinate and Y coordinate corresponds to (x, y)=(21.35, 43.33) from the table 11 shown in FIG. 25. This rate "1.2" is multiplied with the z value to correct the z value.

From the foregoing, the storing section (not shown) is provided for the strength correcting section 615F, one correction table 11 having a plurality of correction parameters in accordance with coordinate positions in the x and y directions of a detection surface is stored on the storing section (not shown), and the strength correcting section 615F performs strength-correction on a capacitance property of absolute value information (z) that periodically varies, to a uniform capacitance property, using a correction parameter in accordance with a coordinate position, while referring to one correction table 11 in accordance with the absolute value information (z) of the capacitance value.

Figure 26:
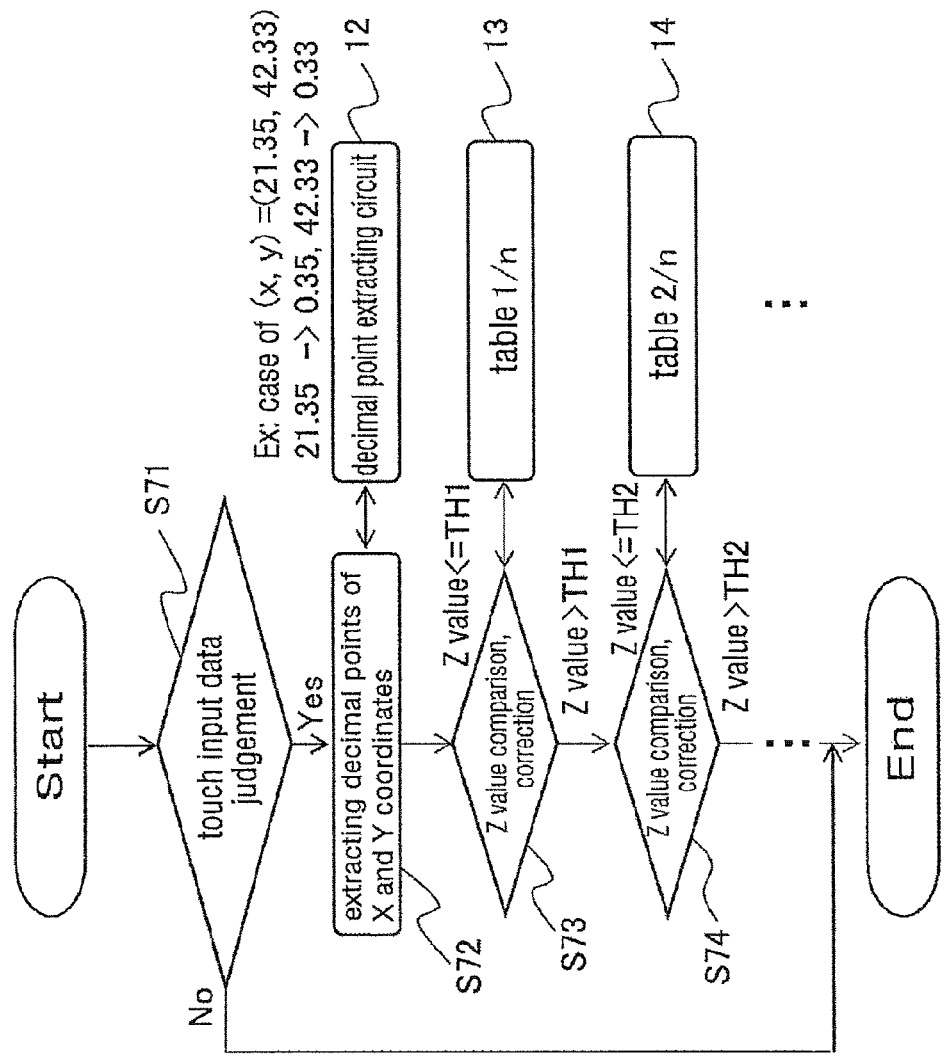
FIG. 26 is a flowchart showing another case example in which a strength correcting section of FIG. 3 performs strength correction processing while referring to a plurality of correction parameters (tables).

FIG. 26 is a flowchart showing another case that the strength correcting section 615F of FIG. 3 performs strength correction processing while referring to a plurality of correction parameters (tables).

As shown in FIG. 26, first, at step S71, touch input judging processing is performed. If the judging result is touch input "no" (No), then the processing ends and the processing is paused until there is a touch input. If the judging result is touch input "yes" (Yes), then at step S72, the strength correcting section 615F extracts decimal points of the X coordinate and Y coordinate positions using a decimal point extracting circuit 12. Herein, decimal point X coordinate and Y coordinate are, for example, defined as (x, y)=(21.35, 43.33).

Figure 27:
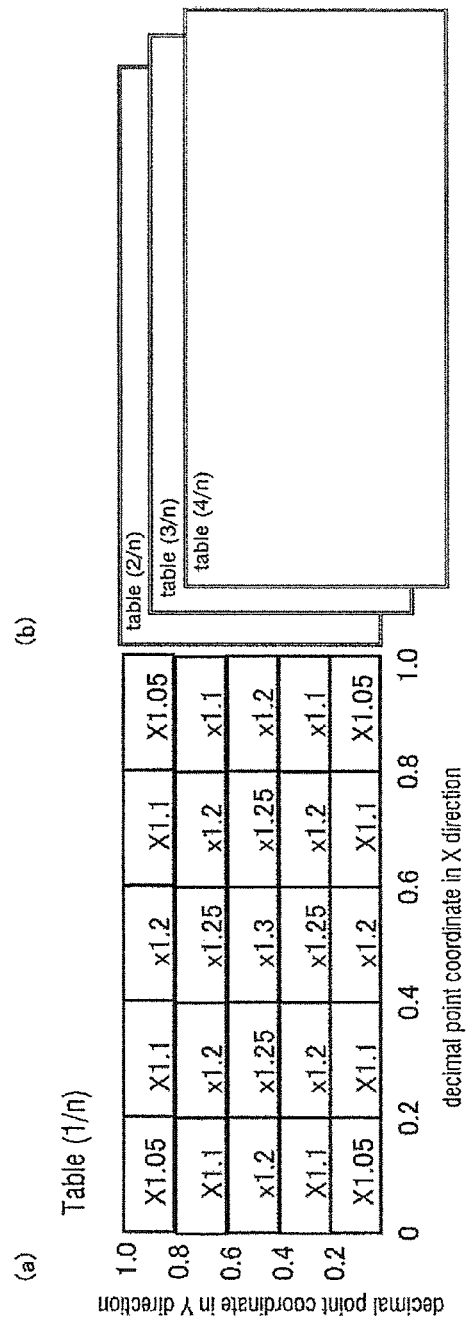
FIG. 27 is a diagram showing a plurality of correction parameters (tables) used in FIG. 25.

Next, at step S73, the strength correcting section 615F judges as to whether the z value is equal to or less than a first threshold value TH1. If the z value is equal to or less than a first threshold value TH1, then the z value is corrected from the decimal point X coordinate and Y coordinate. The correction of the z value extracts a rate "1.2" at which the decimal point X coordinate and Y coordinate corresponds to (x, y)=(21.35, 43.33), from a first table 1/n of the tables 13 shown in FIG. 27(a). The rate "1.2" is multiplied with the z value to correct the z value.

Subsequently, at step S74, the strength correcting section 615F judges as to whether the z value exceeds a first threshold value TH1 but is equal to or less than a second threshold value TH2. If the z value exceeds the first threshold value TH1 but is equal to or less than the second threshold value TH2, then the z value is corrected from the decimal point X coordinate and Y coordinate. The correction of the z value extracts a rate at which the decimal point X coordinate and Y coordinate corresponds to (x, y)=(21.35, 43.33) from a second table 2/n of the tables 14 shown in FIG. 27(b). This rate is multiplied with the z value to correct the z value.

From the foregoing, the strength correcting section 615F is provided with a storing section (not shown), a plurality of correction tables 1/n to n/n, having a plurality of correction parameters in accordance with coordinate positions in the x direction and y direction of a detection surface, are stored on a storing section (not shown), and the strength correcting section 615F performs strength-correction on a capacitance property of absolute value information (z) that periodically varies, to a uniform capacitance property, using a correction parameter in accordance with a coordinate position, while referring to the plurality of correction tables 1/n to n/n in accordance with the absolute value information (z) of the capacitance value.

Figure 28:
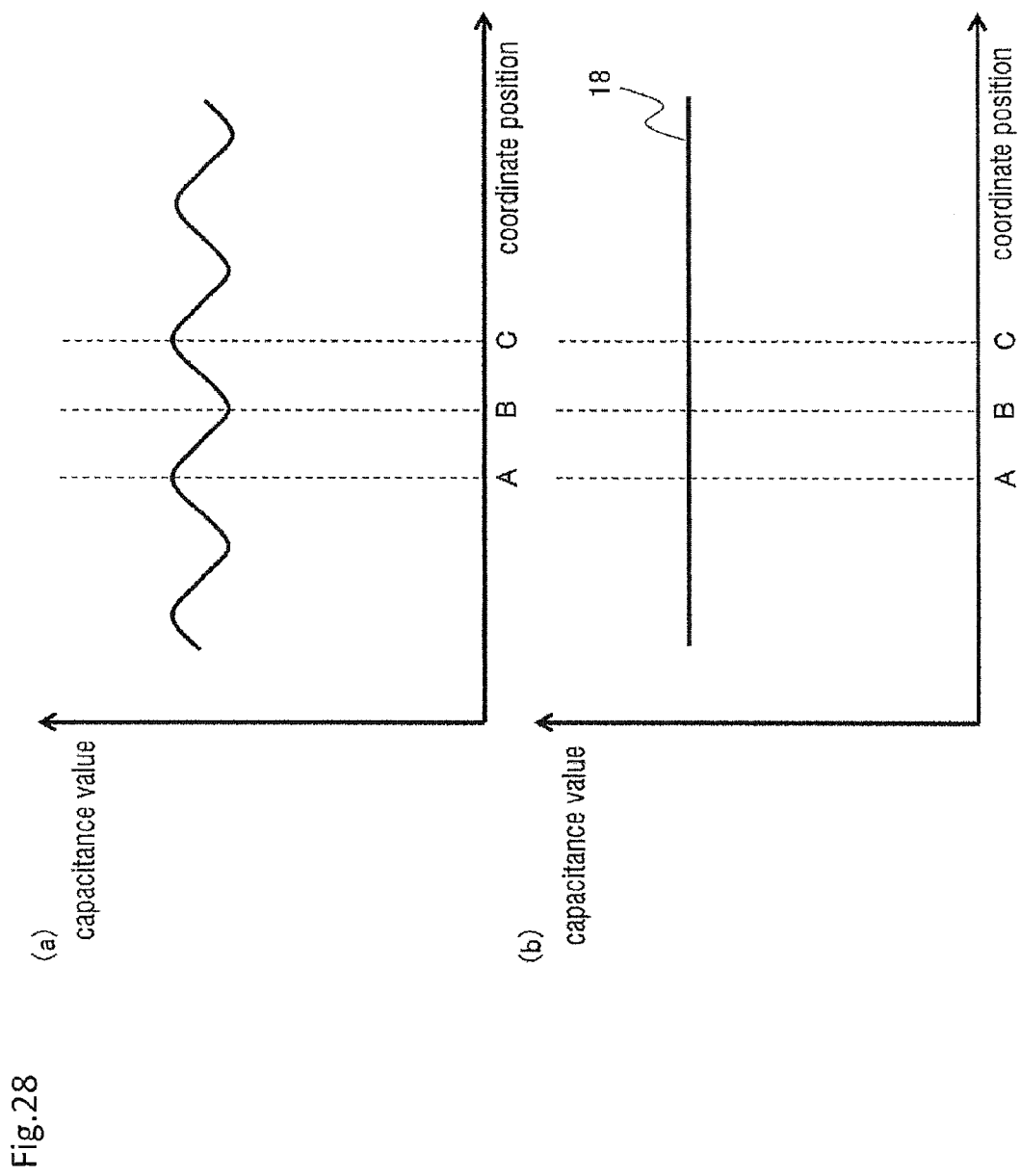
FIG. 28(a) is a graph showing a state in which a capacitance varies at coordinate positions A to C of FIG. 19.
FIG. 28(b) is a graph showing a state in which a capacitance property is corrected to be a linear one to correspond to the maximum value Max of the capacitance of FIG. 28(a).

In summary, a plurality of numbers of tables 1/n to n/n are prepared in accordance with the value of the z value of the capacitance value, and the strength correcting section 615F of FIG. 3 performs strength correction processing in accordance with the value of the z value. As such, a large number of tables 1/n to n/n are prepared so that the variation of the capacitance value of FIG. 28(a) at the coordinate positions A to C of FIG. 19 are adjusted to the maximum value Max of the capacitance to correct it to a linear capacitance property 18 as shown in FIG. 28(b).

As such, the correction can be made while referring to a plurality of correction parameters at a memory (storing section) in accordance with coordinate positions as one or a plurality of tables.

Specifically, the strength correcting section 615F is provided with a storing section (not shown), one or a plurality of correction tables, having appropriate correction parameters in accordance with coordinate positions in the x direction and the y direction of a detection surface, are stored on the storing section (not shown), and the strength correcting section 615F performs strength-correction on a capacitance property of a z coordinate value that periodically varies, to a uniform capacitance property, using a correction parameter in accordance with the coordinate position, while referring to one or a plurality of correction tables in accordance with the z coordinate value (z value) of the capacitance value.

It should be noted that when a correction parameter (table) is stored on a memory (storing section) and the strength correcting section 615F performs strength correction processing while referring to the correction parameter (table), linear interpolation is performed using a one-dimensional coordinate (X or Y coordinate) and a correction parameter of an attenuation amount, or two-dimensional coordinates (X and Y coordinates) to correct absolute value information (z) of a capacitance value. Alternatively, linear interpolation may be performed using two-dimensional coordinates (X and Y coordinates), absolute value information (z) of a capacitance value, and a correction parameter of an attenuation amount to correct the absolute value information (z) of the capacitance value. Alternatively, linear interpolation may be performed using two-dimensional coordinates (X and Y coordinates), a Z value (absolute value information (z) of a capacitance value) of a touching passive pen, and a correction parameter of an attenuation amount to correct the absolute value information (z) of the capacitance value.

Figure 29:
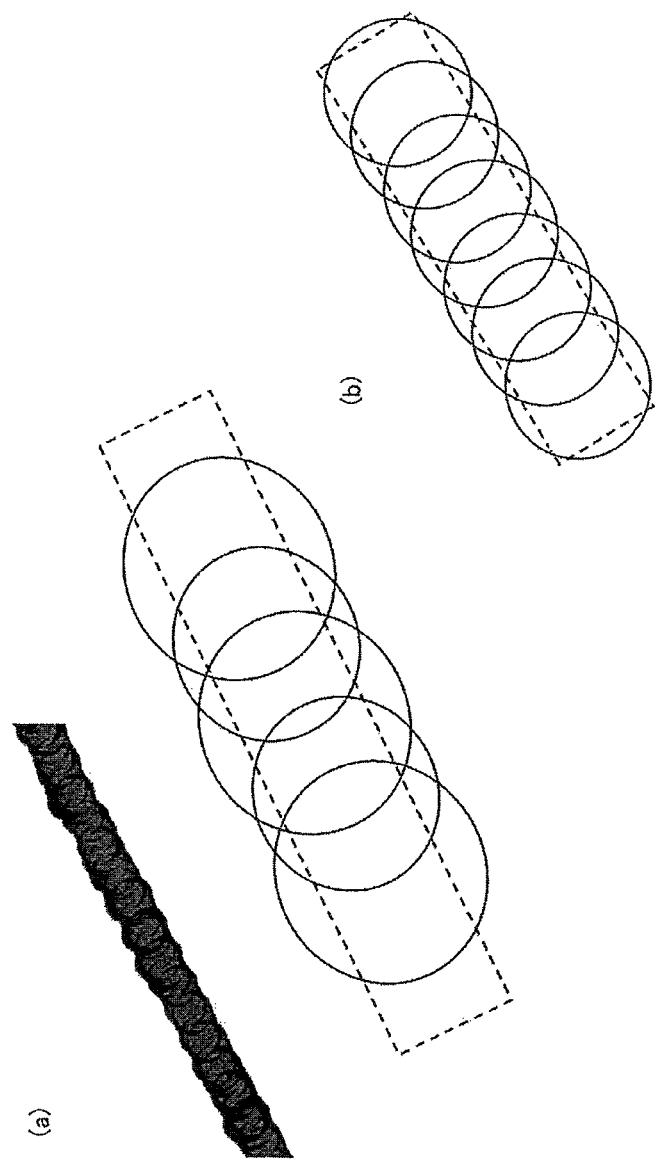
FIG. 29(a) is a figure of a state before the application of strength correction processing, showing a state of a letter line of which the drawn circle diameters vary so that the line widths are coarsely varied.
FIG. 29(b) is a figure of a state of a letter line after the application of strength correction processing, where coarse variation of the line widths is eliminated and the letter is drawn with a substantially uniform letter width.

Thus, symbols and letters are conventionally drawn with a group of circles of which the circle diameters and shade are successively changed in accordance with a z value of the three-dimensional coordinates (x, y, z) of a capacitance, with the touch coordinates as the center; and even if the capacitance value to be detected varies, the touch coordinates are detected while emphasizing as to whether or not the capacitance value exceeds a threshold value. However, even if two-dimensional coordinates (X and Y coordinates) of the capacitance value are touched as the same coordinates, the capacitance value to be detected varies in accordance with the position in a region within a unit lattice (center or periphery thereof). Thus, there are variations occurring in the difference values between the threshold value and the z value as the capacitance value to be detected, and the z value detection accuracy of touch coordinates is not equalized. The z value itself varies. As the z value varies, symbols and letters are drawn with a group of circles of which the circle diameters and shade are successively changed in accordance with the z value, as shown in FIG. 29(a). This results in a letter line whose line width prior to the application of the strength correction processing is coarsely varied.

In this regard, according to Embodiment 1, in a touch panel system 1 for indicating an input position to a touch panel 3 to perform displaying corresponding thereto, the detection standard determining section 615 of the controller section 6 comprises the strength correcting section 615F for performing strength correction on a capacitance property of absolute value information (z) that periodically varies in at least one direction of the x and y directions of a detection surface (x, y), to a uniform capacitance property, with regard to distribution of three-dimensional coordinates (x, y, z) including absolute value information (z) of a capacitance value that periodically varies for each predetermined position within the detection surface (x, y) obtained from each output signal of the touch panel 3.

As such, by the strength correction processing performed by the strength correcting section 615F of FIG. 3, the difference values between the z value as a capacitance value to be detected and the threshold value can be equalized (flattened); and at the same coordinate position, the difference values between the threshold value and the capacitance value (z value) detected due to touching can be equalized (flattened). As a result, when a circle diameter in accordance with the z value is obtained as shown in FIG. 29(b), the coarse variation of the line width prior to the application of the strength correction processing (FIG. 29(a)) is eliminated and a letter line with a substantially uniform letter width can be drawn. Accordingly, the detection accuracy of the indicator can be improved.

(Pen Pressure Converting Processing)

Figure 30:
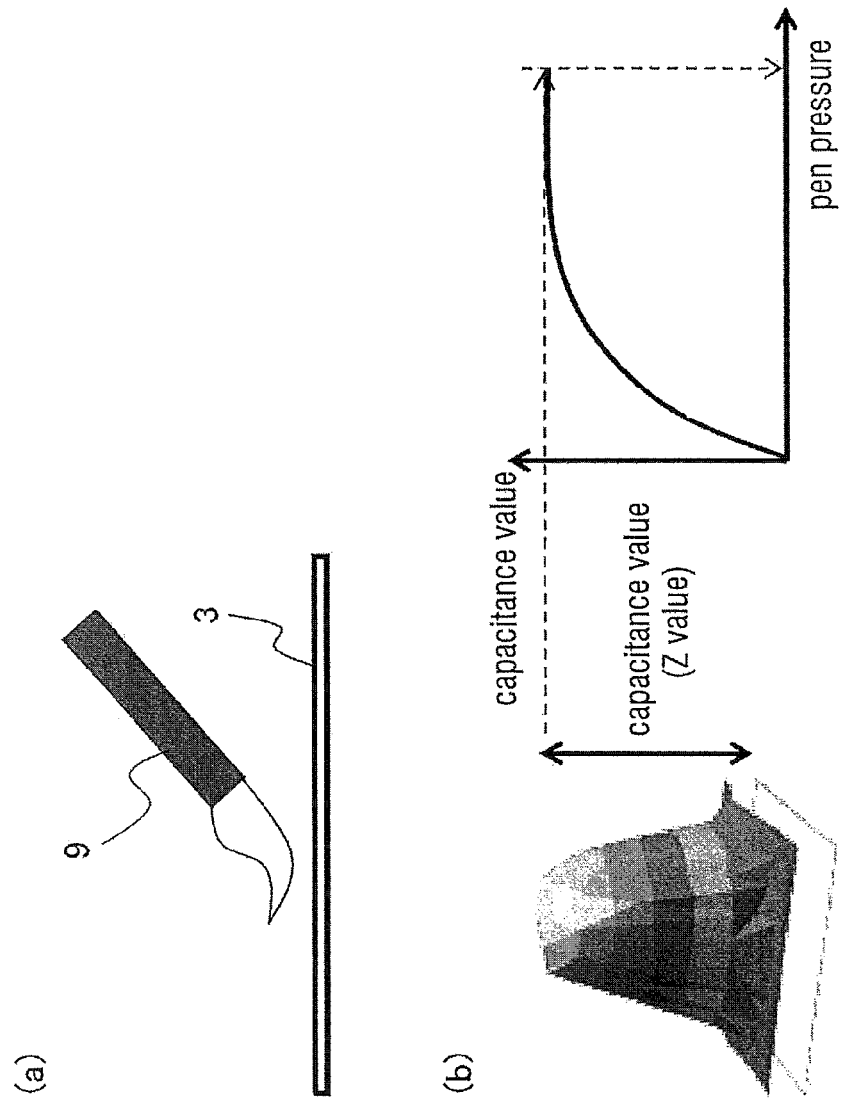
FIG. 30(a) is a side view of a case that a brush-like touch pen contacts a surface of a touch panel to draw.
FIG. 30(b) is a figure for describing that a pen pressure is determined in accordance with a z value of three-dimensional coordinates (x, y, z) of a capacitance value detected by a touch panel.

FIG. 30(a) is a side view of a case that a brush-like touch pen 9 contacts a surface of a touch panel 3 to draw. FIG. 30(b) is a figure for describing that a pen pressure is determined in accordance with a z value of three-dimensional coordinates (x, y, z) of a capacitance value detected by a touch panel 3.

As shown in FIG. 30(a) and FIG. 30(b), in a touch panel system 1 for successively driving each at least two adjacent drive lines to obtain an input position (x, y) input on a surface of a touch panel 3 using a brush-like touch pen 9 as an indicator as three-dimensional coordinates (x, y, z) including absolute value information (z) of a capacitance value, thus performing displaying corresponding to the three-dimensional coordinates (x, y, z), the touch panel system 1 comprises a pen pressure converting section 416D for converting the absolute value information (z) of the capacitance value of the obtained three-dimensional coordinates (x, y, z) into pen pressure data, wherein displaying is performed on a display screen based on the converted pen pressure data.

The pen pressure converting processing performed by the pen pressure converting section 416D of FIG. 4 is such that when a brush-like touch pen 9, of which the pen tip has a plurality of dielectrics bundled with a conductive body and thus is elastic, is caused to contact the surface of the touch panel 3 in order to to draw, the z value of absolute value information (z) of a capacitance value reacted in accordance with an electrode shape (contacting shape of the brush) on the surface of the touch panel 3 that the touch pen 9 contacted, is converted into pen pressure data.

In summary, conventionally, in order to obtain a sufficient multiple gradation levels, a brush-like touch pen 9 is required to be formed as an active pen with a pen pressure sensor, a battery and a communication apparatus built therein, and the touch panel 3 is also required to have a communication apparatus built therein. With a capacitive touch panel, however, capacitance values from a passive pen that does not have a battery or a communication apparatus built therein are converted into pen pressure data, so that capacitance values of touch coordinates and the periphery thereof of the touch panel 3 are converted into pen pressure data even though no pen pressure sensors are mounted therein.

As discussed above, each at least two adjacent drive lines are successively driven so that output signals in accordance with the difference in capacitance are output, and balances out noise. Accordingly, it becomes possible to have sufficient allowance for the difference between the coordinate signal level and threshold value level (5 to 20 times more compared to the conventional one) and a great capacitance value is detected. The difference value (z value) of the capacitance value is converted into pen pressure data with multiple gradations, and the pen pressure can be controlled in detail, based on the pen pressure data, to express the letter boldness and shading at multi-levels.

With the configuration described above, the operation thereof will be described hereinafter.

Figure 31:
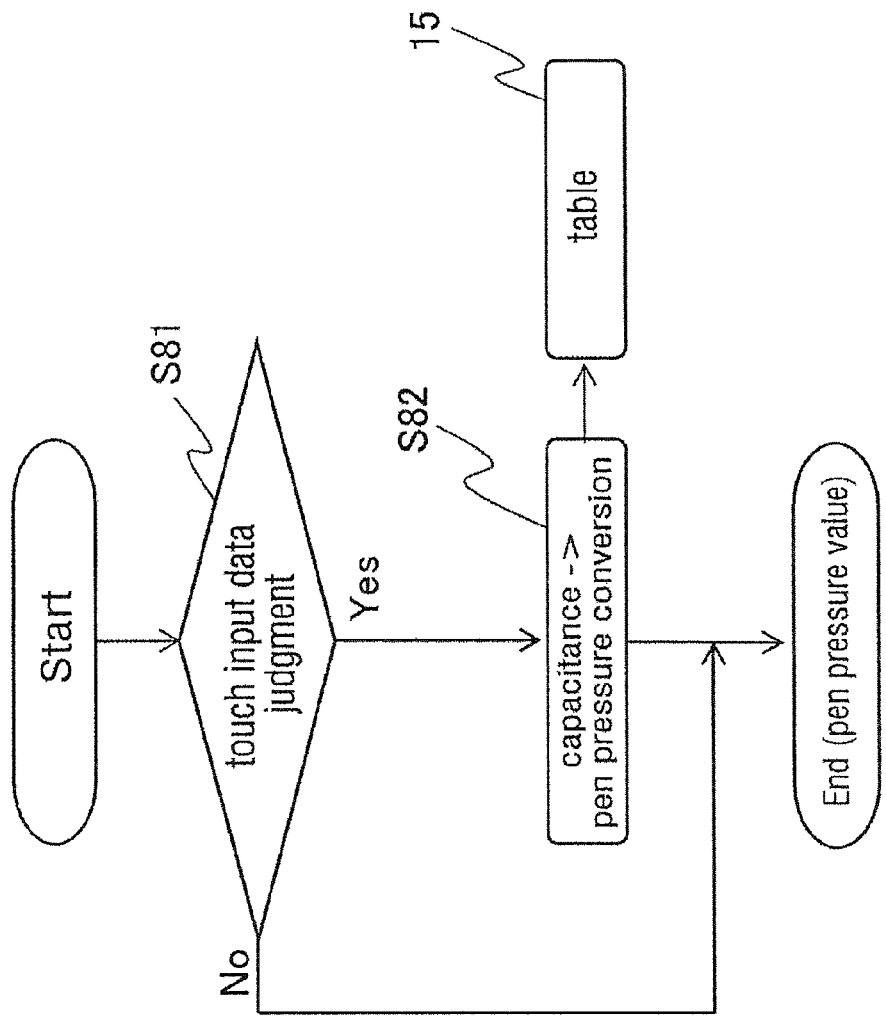
FIG. 31 is a flowchart showing a case example that a pen pressure converting section of FIG. 4 performs pen pressure converting processing while referring to a plurality of correction parameters (tables).

FIG. 31 is a flowchart showing a case example that a pen pressure converting section 616D of FIG. 4 performs pen pressure converting processing while referring to a plurality of correction parameters (tables).

Figure 33:
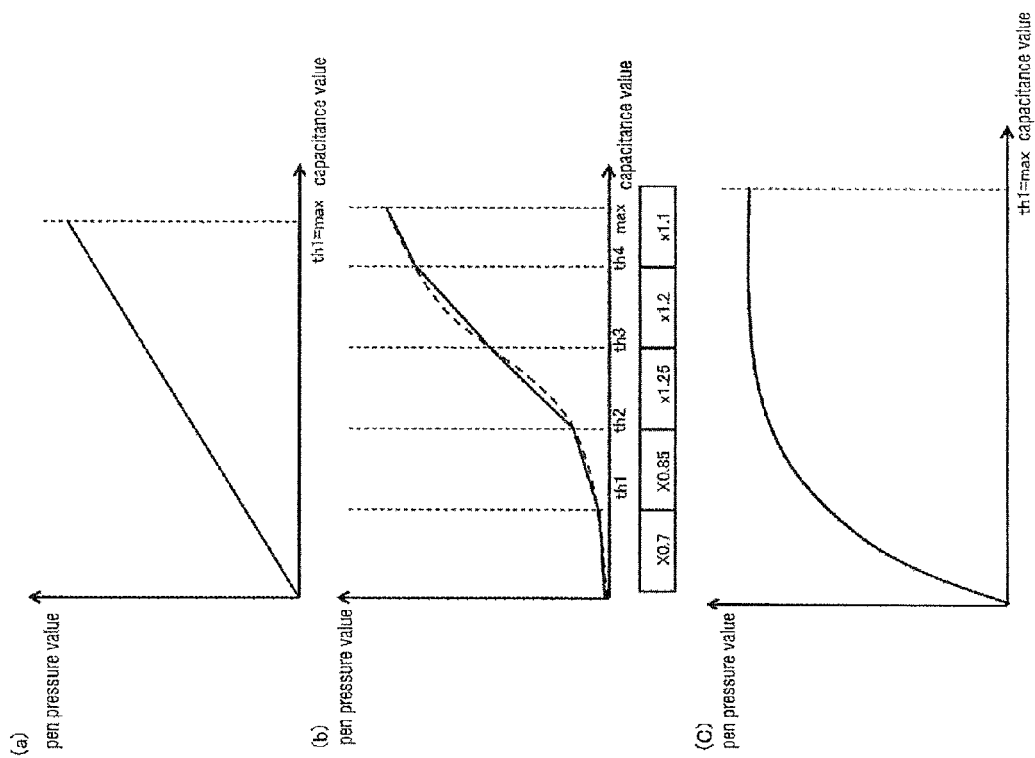
FIG. 33(a) is a graph for describing a case example in which processing of pen pressure data converting, with regard to a capacitance value of pen pressure, linearly changes at a predetermined inclination.
FIG. 33(b) is a graph for describing a case example in which processing of a capacitance value of pen pressure value converting is divided by a plurality of sections, and the inclination of pen pressure data with regard to the capacitance value is determined for each section of the capacitance value, and the inclination linearly changes.
FIG. 33(c) is a graph for describing a case example of processing of pen pressure data with regard to a capacitance value of pen pressure converting, in which an amount of change in a pen pressure value changes when a capacitance value is small and large.

As shown in FIG. 31, first, touch input judging processing is performed at step S81. If the judging result is touch input "no" (No), then the processing ends and the processing is paused until there is a touch input. If the judging result is touch input "yes" (Yes), then the pen pressure converting section 616D converts a capacitance value, reacted in accordance with an electrode shape (contacting shape of a brush) on the surface of the touch panel 3 that the touch pen 9 contacted, into pen pressure data while referring to a table 15 at step S82. In the table 15, the pen pressure value with regard to the capacitance value linearly changes at a predetermined inclination as shown in FIG. 33(a). In summary, a pen pressure value (pen pressure data) is obtained that is proportional to the z value of the absolute value information (z) of the capacitance value, and the boldness and shading of letters are expressed and displayed on the display screen based on the pen pressure data. Note that the pen pressure value with regard to the capacitance value first shows a change of steep rise when the capacitance value is small as shown in FIG. 33(c). However, as the capacitance value increases to some extent, it is also possible to allow the pen pressure value to hardly change. As such, with regard to the pen pressure data with regard to the capacitance value of the pen pressure converting processing, as the capacitance value changes from a small value to a large value, it is also possible to cause the amount of change in the pen pressure value to be gradually small.

Note that the pen pressure converting section 616D converts a capacitance value, reacted in accordance with a contacting shape of the surface of the touch panel 3 that an indicator contacted, into pen pressure data while referring to one of the tables 15. The table 15 stores pen pressure data with regard to capacitance values, and the pen pressure data with regard to the capacitance values linearly change at a predetermined inclination.

Figure 32:
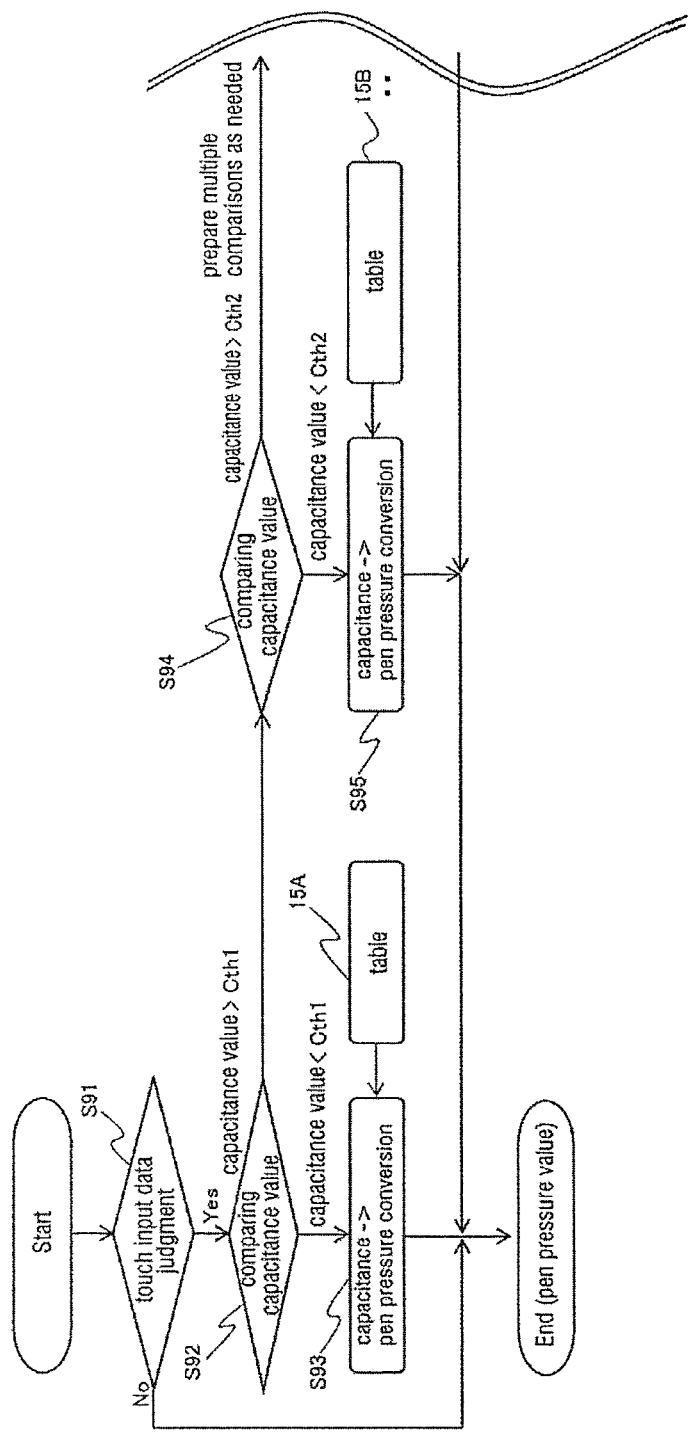
FIG. 32 is a flowchart showing another case example that the pen pressure converting section of FIG. 4 performs pen pressure converting processing while referring to a plurality of correction parameters (tables).

FIG. 32 is a flowchart showing another case example that the pen pressure converting section 616D of FIG. 4 performs pen pressure converting processing while referring to a plurality of correction parameters (tables).

As shown in FIG. 32, first, touch input judging processing is performed at step S91. If the judging result is touch input "no", then the processing ends and the processing is paused until there is a touch input. If the judging result is touch input "yes" (Yes), then it is judged as to whether or not the detected capacitance value is equal to or less than a predetermined threshold value Cth1 at step S92.

Next, at step S92, if the capacitance value is equal to or less than the predetermined threshold value Cth1, the pen pressure converting section 616D converts the capacitance value, reacted in accordance with an electrode shape (contacting shape of the brush) on the surface of the touch panel 3 that the touch pen 9 contacted, into pen pressure data while referring to a table 15A as pen pressure converting processing at step S93. In the table 15A, the pen pressure value with regard to the capacitance value is at the rate of "0.7" with a predetermined inclination as shown in FIG. 33(b).

Subsequently, if the capacitance value exceeds a predetermined first threshold value Cth1 and is equal to or less than a second threshold value Cth2 at step S94, then the pen pressure converting section 616D converts the capacitance value, reacted in accordance with an electrode shape (contacting shape of the brush) on the surface of the touch panel 3 that the touch pen 9 contacted, into pen pressure data while referring to a table 15B at step S95. In the table 15B, the pen pressure value with regard to the capacitance value is at the rate of "0.85" with a predetermined inclination as shown in FIG. 33(b).

Subsequently, although not shown, if the capacitance value exceeds the predetermined second threshold value Cth2 and is equal to or less than a third threshold value Cth3, then the pen pressure converting section 616D converts the capacitance value, reacted in accordance with the electrode shape (contacting shape of the brush) on the surface of the touch panel 3 that the touch pen 9 contacted, into pen pressure data while referring to a next table, as pen pressure converting processing. In the next table, the pen pressure value with regard to the capacitance value is at the rate of "1.25" with a predetermined inclination as shown in FIG. 33(b).

Furthermore, although not shown, if the capacitance value exceeds the predetermined threshold value Cth3 and is equal to or less than a fourth threshold value Cth4, then the pen pressure converting section 616D converts the capacitance value, reacted in accordance with the electrode shape (contacting shape of the brush) on the surface of the touch panel 3 that the touch pen 9 contacted, into pressure data while referring to a further next table, as pen pressure converting processing. In the further next table, the pen pressure value with regard to the capacitance value is at the rate of "1.2" with a predetermined inclination as shown in FIG. 33(b).

Furthermore, although not shown, if the capacitance value exceeds the predetermined fourth threshold value Cth4 and is equal to or less than a fifth threshold value Cth5, then the pen pressure converting section 616D converts the capacitance value, reacted in accordance with the electrode shape (contacting shape of the brush) on the surface of the touch panel 3 that the touch pen 9 contacted, into pen pressure data while referring to a further next table, as pen pressure converting processing. In the further next table, the pen pressure value with regard to the capacitance value is at the rate of "1.1" with a predetermined inclination as shown in FIG. 33(b).

Note that the pen pressure converting section 616D converts a capacitance value, reacted in accordance with a contacting shape of the surface of a touch panel 3 that an indicator contacted, into pen pressure data while referring to a plurality of tables 15A to 15E (not shown). The plurality of tables 15A to 15E (not shown) store pen pressure data with regard to a capacitance value. The capacitance value is divided into a plurality of sections, the inclination of the pen pressure data with regard to the capacitance value is determined and linearly changed, for each section of the capacitance value.

Thus, according to Embodiment 1, comprised is a touch panel system 1 for successively driving each at least two adjacent drive lines, indicating an input position (x, y) of an indicator to obtain three-dimensional coordinates (x, y, z) of a capacitance value, and performing displaying corresponding to the three-dimensional coordinates (x, y, z), wherein the touch panel system 1 comprises a pressure converting section 616D for converting absolute value information (z) of the capacitance value of the three-dimensional coordinates (x, y, z) into pen pressure data, and wherein displaying is made based on the pen pressure data.

As such, the absolute value information (z) of the capacitance value of the three-dimensional coordinates (x, y, z) is converted into pen pressure data; and thus it becomes possible to add strength and weakness (shading) to the boldness of the symbols and letters to be drawn by pen pressure, so that the line of the letters can be changed to be thinner or thicker.

Figure 34:
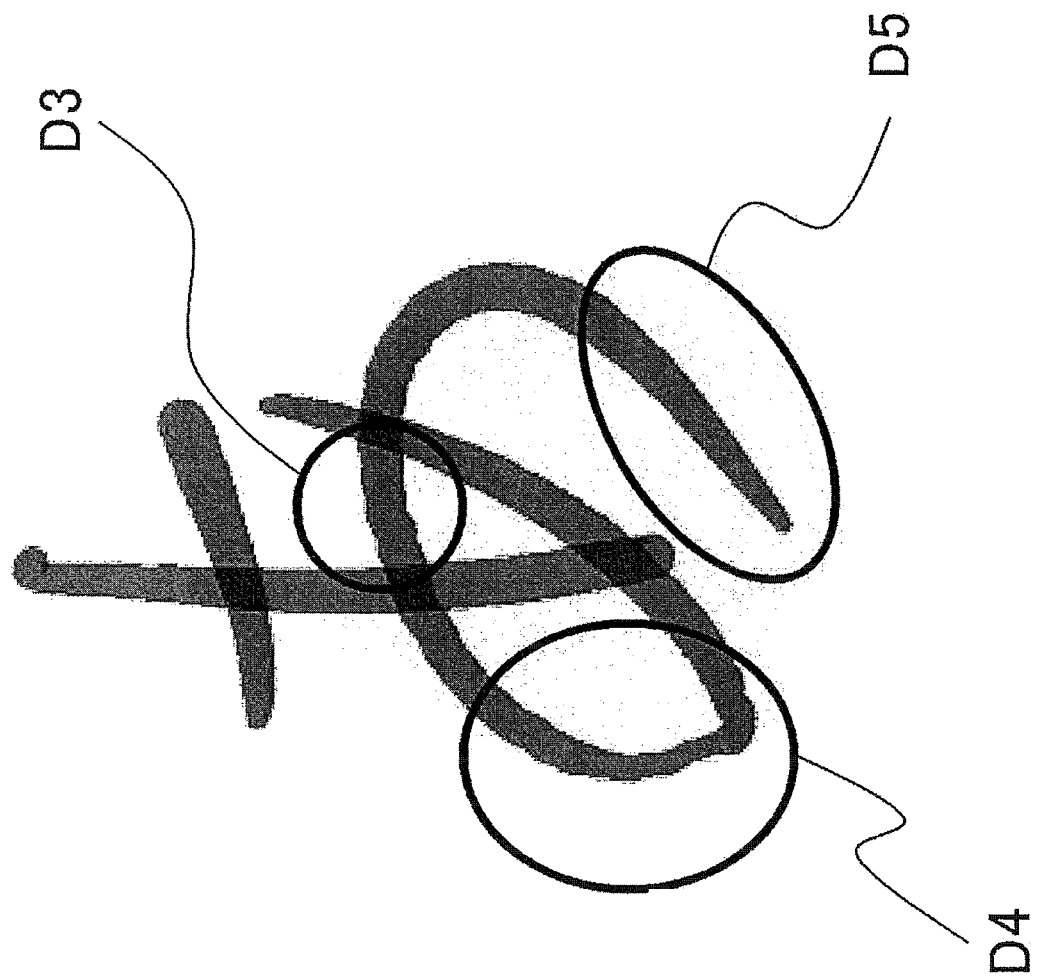
FIG. 34 is a figure showing a letter "A" drawn by touch panel system according to Embodiment 1.

FIG. 34 shows a letter "A" drawn by the touch panel system 1 according to Embodiment 1. As shown by D3 of FIG. 34, the coarse variation of the line width after the application of the strength correction processing is eliminated and the letter is drawn with a substantially uniform letter width. As shown by D4 and D5 of FIG. 34, the state of the drawn letter "A" with strength and weakness added to the boldness of the letter so that the letter line gradually becomes thinner, and the state of the thicker letter line being once thinner and again being thicker are expressed by the pen pressure.

Moreover, pen pressure data are effectively detected with the passive pen, and it is not necessary to transfer the pen pressure data from the touch pen to the touch panel. Thus, no batteries are required for the touch pen itself, and no communication apparatuses are required for both the touch pen and the touch panel, which reduces the weight as well as the size of the touch pen itself.

(Embodiment 2)

Figure 35:
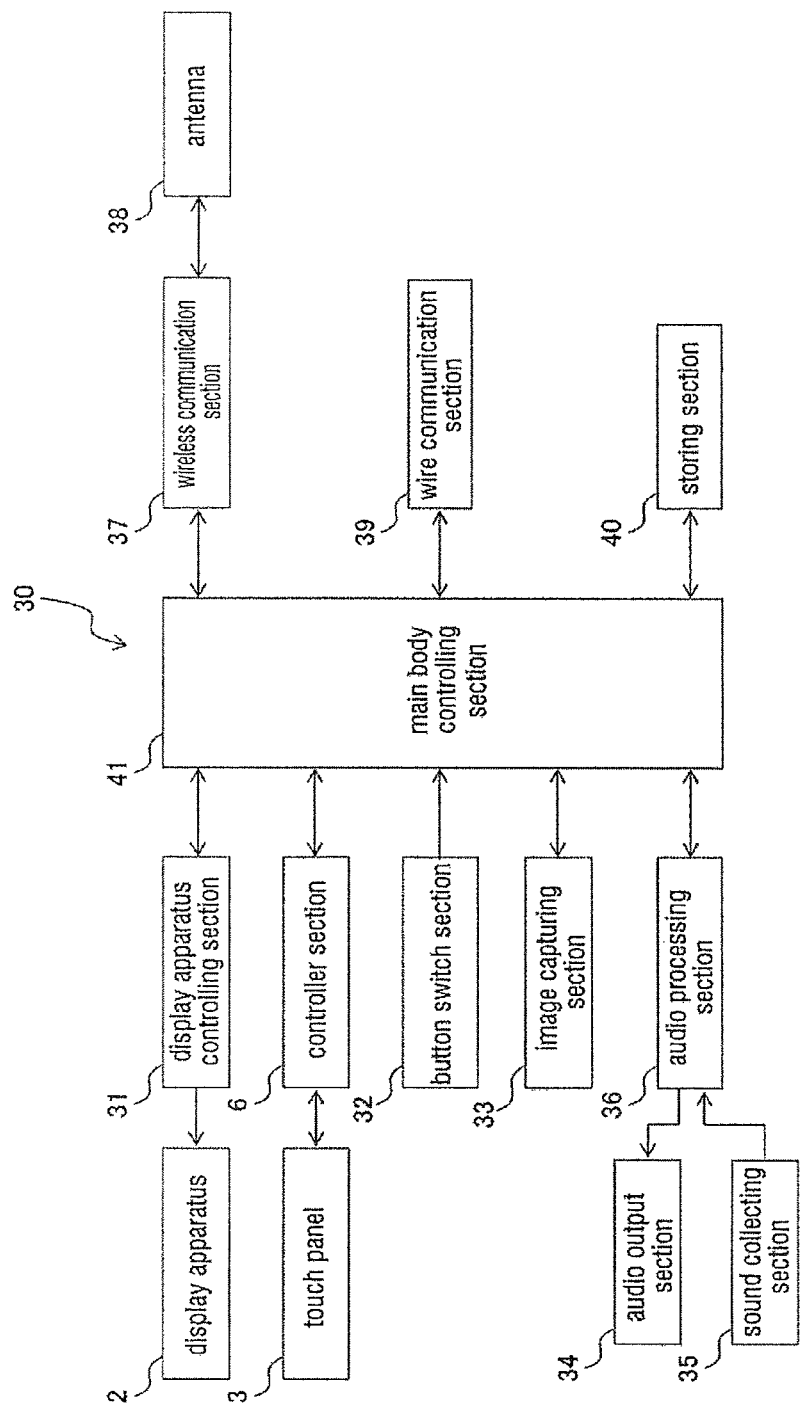
FIG. 35 is a block diagram showing a diagrammatic configuration example of an electronic device with a touch panel system 1 according to Embodiment 1 of the present invention, as Embodiment 2 of the present invention.
Figure 36:
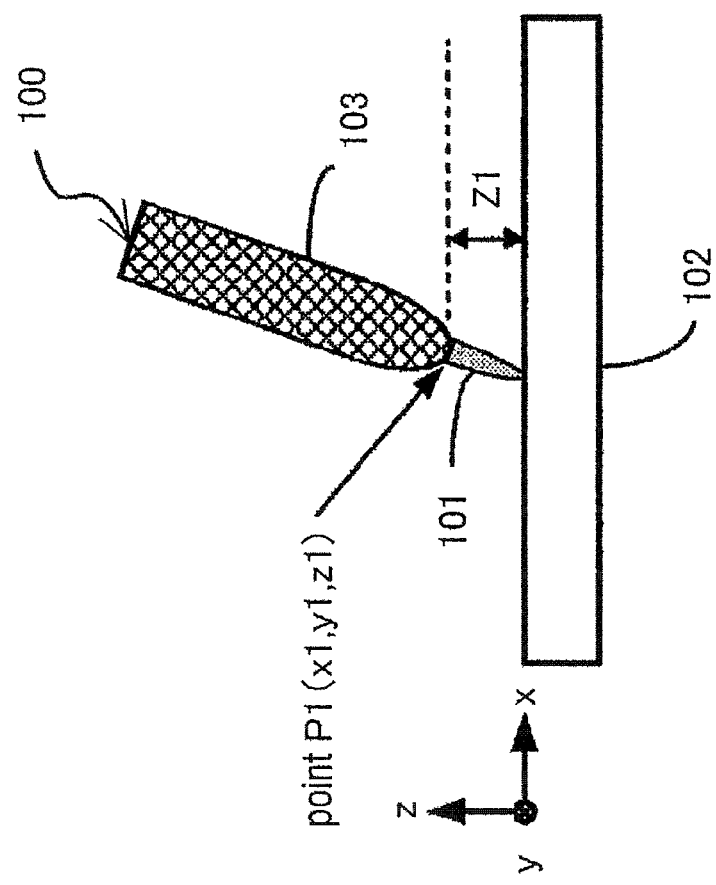
FIG. 36 is a side view of a case that an input to the touch panel is made using the conventional touch pen disclosed in Patent Document 1.
Figure 37:
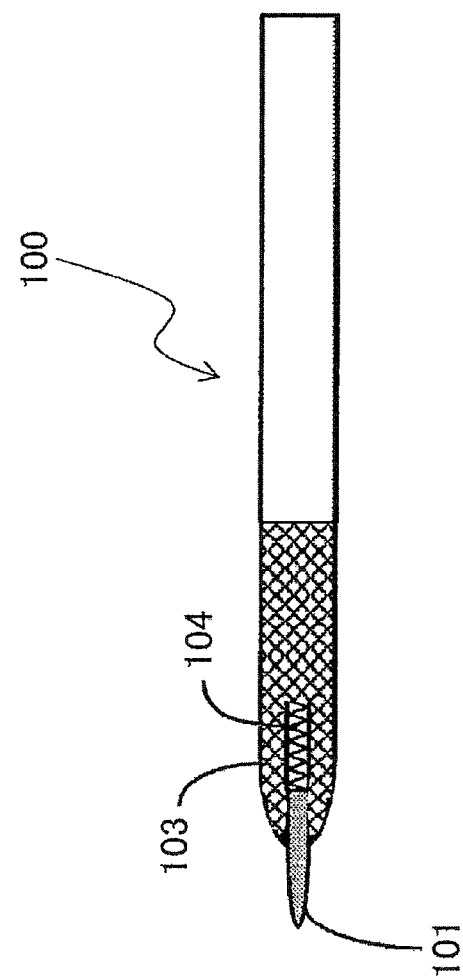
FIG. 37 is a side view schematically showing a state where a tip section of the conventional touch pen in FIG. 36 is biased by a spring.
Figure 38:
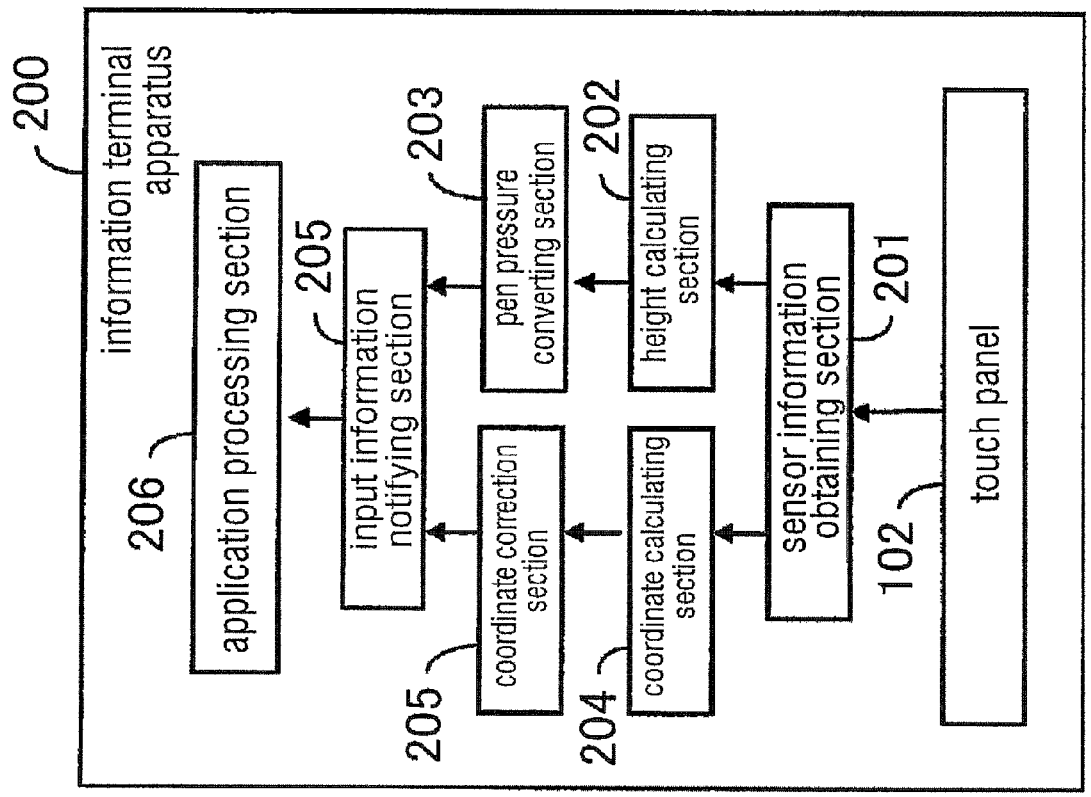
FIG. 38 is a functional block diagram of a conventional information terminal apparatus with which a conventional touch pen and touch panel of FIG. 36 are used.
Figure 39:
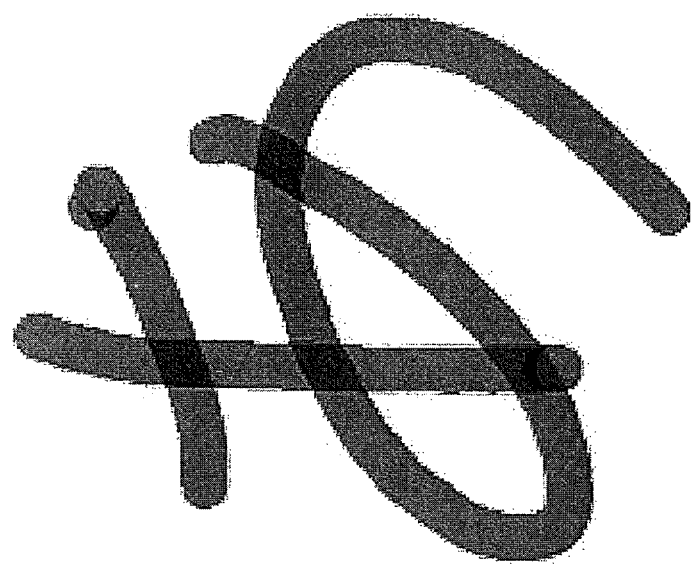
FIG. 39 is a figure showing a letter "A" drawn with prior art.
Figure 40:
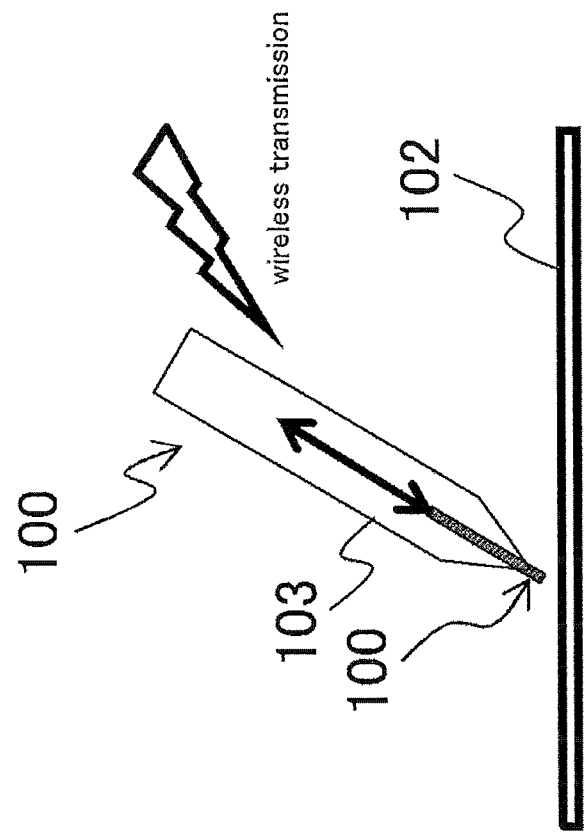
FIG. 40 is a side view schematically showing a state where a conventional touch pen and touch panel in FIG. 37 communicate with each other for transmitting pen pressure data.

FIG. 35 is a block diagram showing a diagrammatic configuration example of an electronic device with a touch panel system 1 according to Embodiment 1 of the present invention, as Embodiment 2 of the present invention.

In FIG. 35, an electronic device 30 according to Embodiment 2 comprises: a display apparatus 2 of Embodiment 1 described above; a display apparatus controlling section (corresponding to an application section) for controlling the display of the display apparatus 2; a touch panel 3 arranged on a display screen of the display apparatus 2; a controller section 6 for driving the touch panel 3 to detect touch coordinates of the touch panel 3 and for performing a variety of types of processing, such as surface data extraction, strength correction and pen pressure conversion; a button switch section 32 for receiving an instruction operation by a user, such as on and off switching and camera switching; an image capturing section 33 capable of generating image data; an audio output section 34 for converting audio data into a sound to be output, such as a speaker; a sound collecting section 35 for collecting a sound and converting the sound into audio data, such as a microphone; an audio processing section 36 for processing audio data to be sent to the audio output section 34 and for processing audio data from the sound collecting section 35; a wireless communication section 37 for wirelessly communicating with an external electronic device; an antenna 38 for externally transmitting wireless communication data as electromagnetic waves and for receiving electromagnetic waves radiated from an external electronic device; a wire communication section 39 for wire-communicating with an external electronic device; a storing section 40 for storing a variety of types of data; and a main body controlling section 41 (corresponding to the host terminal 8 in FIG. 1) for controlling the operation of the overall device. With regard to the host terminal 8 of FIG. 1, the host terminal 8 internally comprises an application section, which functions as the display apparatus controlling section 31. Needless to say, the controller section 6 may be included within the main body controlling section 41.

Note that in Embodiment 1, operations of respective sections have been described with reference to a variety of flowcharts. With regard to the respective sections, the operations mean a variety of types of processing that are performed as a result of control programs, stored on a ROM (storing section) functioning as a readable storage medium, to be read out to a RAM (work memory) upon start-up, and that are performed by a control section (CPU: Central Processing Unit) based on the control programs.

Note that in Embodiment 1, it is configured that a uniform capacitance property is caused to correspond to a peak capacitance value that periodically varies in accordance with a predetermined position within a detection surface. Without limitation to this, however, the strength correcting section, for correcting a variation of a capacitance property periodically varying for each predetermined position of the detection surface with regard to at least one direction of the x and y directions of positional information (x, y) of the detection surface, may also be configured such that within at least one cycle, in which the capacitance property varies for each predetermined position, information (z) of a capacitance value to be output is information (z) of any one of the capacitance values within the range of the cycle, obtained within the cycle.

As described above, the present invention is exemplified by the use of its preferred Embodiments 1 and 2. However, the present invention should not be interpreted solely based on Embodiments 1 and 2 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 and 2 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a touch panel system with an input operation to indicate a position performed on a touch panel, thus performing displaying corresponding thereto, and an electronic device, such as a PC (personal computer) and a tablet terminal, with the touch panel system used therewith. According to the present invention, it becomes possible to reflect change in a contacting shape of an indicator, such as a contacting shape of a finger, a brush or other indicators, on symbols or letters, so that the boldness of the symbols and letters as well as drawing shapes thereof can be expressed more clearly, and so that the drawing shape of the symbols and letters can have individuality.

The invention claimed is:

1. A touch panel system for measuring output signals of at least two adjacent sensor lines to obtain an input position (x, y) of an indicator and information (z) of a capacitance value from a difference value between the output signals of at least two adjacent sensor lines,
   the touch panel system comprising a pen pressure converting section for converting the information (z) of the capacitance value into pen pressure data, wherein the input position (x, y) and the pen pressure data are transmitted to a drawing controlling section.

2. The touch panel system according to claim 1, wherein the pen pressure converting section converts information (z) of a region capacitance value measured in accordance with the contacting or approaching of the indicator to the touch panel into pen pressure data by referring to one or a plurality of tables.

3. The touch panel system according to claim 2, wherein the table stores pen pressure data to be corrected in accordance with the indicator, wherein the pen pressure data with regard to the information (z) of the region capacitance value changes in a two-dimensional function manner at a predetermined inclination.

4. The touch panel system according to claim 2, wherein:
the plurality of tables store the pen pressure data with regard to the information (z) of the region capacitance value;
the information (z) of the region capacitance value is divided into a plurality of sections; and
inclination of the pen pressure data with regard to the information (z) of the region capacitance value is determined and linearly changed for each section of the information (z) of the region capacitance value.

5. An electronic device capable of performing a positional input with a touch panel system according to claim 1.

6. A method of obtaining pen pressure data for a touch panel system, comprising the steps of:
applying a signal to a drive line;
obtaining capacitance value (z) information, in addition to an input position (x, y) information of an indicator from a difference value between output signals obtained from at least two adjacent sensor lines;
converting a region capacitance value (z) obtained from the three-dimensional coordinates (x, y, z) into pen pressure data; and
transmitting the converted pen pressure data to a host terminal.

7. The method according to claim 6, wherein the pen pressure converting section converts information (z) of a region capacitance value measured in accordance with the contacting or approaching of the indicator to the touch panel into pen pressure data by referring to one or a plurality of tables.

8. The method according to claim 7, wherein the table stores pen pressure data to be corrected in accordance with the indicator, wherein the pen pressure data with regard to the information (z) of the region capacitance value changes in a two-dimensional function manner at a predetermined inclination.

9. The method according to claim 7, wherein:
the plurality of tables store the pen pressure data with regard to the information (z) of the region capacitance value;
the information (z) of the region capacitance value is divided into a plurality of sections; and
inclination of the pen pressure data with regard to the information (z) of the region capacitance value is determined and linearly changed for each section of the information (z) of the region capacitance value.

* * * * *